(12) United States Patent
Oberheide et al.

(10) Patent No.: US 9,455,988 B2
(45) Date of Patent: Sep. 27, 2016

(54) SYSTEM AND METHOD FOR VERIFYING STATUS OF AN AUTHENTICATION DEVICE

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 15/095,498

(22) Filed: Apr. 11, 2016

(65) Prior Publication Data

US 2016/0226872 A1 Aug. 4, 2016

Related U.S. Application Data

(63) Continuation of application No. 14/455,630, filed on Aug. 8, 2014, and a continuation of application No. 14/188,480, filed on Feb. 24, 2014, now Pat. No. 9,338,156.

(60) Provisional application No. 61/863,826, filed on Aug. 8, 2013, provisional application No. 61/768,248, filed on Feb. 22, 2013.

(51) Int. Cl.
| | |
|---|---|
| *G06F 21/00* | (2013.01) |
| *H04L 29/06* | (2006.01) |
| *H04L 9/32* | (2006.01) |
| *G06F 21/31* | (2013.01) |
| *G06F 21/44* | (2013.01) |
| *G06F 21/45* | (2013.01) |

(52) U.S. Cl.
CPC ........... *H04L 63/0876* (2013.01); *G06F 21/31* (2013.01); *G06F 21/44* (2013.01); *G06F 21/45* (2013.01); *H04L 9/3247* (2013.01); *G06F 2221/2131* (2013.01)

(58) Field of Classification Search
CPC ... H04L 63/0876; G06F 21/44; G06F 21/31; G06F 21/45; G06F 2221/2131
See application file for complete search history.

(56) References Cited

U.S. PATENT DOCUMENTS

| | | |
|---|---|---|
| 5,838,792 A | 11/1998 | Ganesan |
| 5,870,723 A | 2/1999 | Pare et al. |
| 6,119,096 A | 9/2000 | Mann et al. |
| 6,209,091 B1 | 3/2001 | Sudia et al. |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |

(Continued)

OTHER PUBLICATIONS

Simske et al., "APEX: Automated Policy Enforcement eXchange", Sep. 21-24, 2010, ACM, pp. 139-142.

(Continued)

*Primary Examiner* — Don Zhao
(74) *Attorney, Agent, or Firm* — Jeffrey Schox; Thomas Gwinn

(57) ABSTRACT

A system and method that includes receiving a first device profile and associating the first device profile with a first application instance that is assigned as an authentication device of a first account; receiving a second device profile for a second application instance, wherein the second application instance is making a request on behalf of the first account; comparing the second device profile to the first device profile; and completing the request of the second application instance according to results of comparing the second device profile and the first device profile.

37 Claims, 14 Drawing Sheets

(56) References Cited

U.S. PATENT DOCUMENTS

| | | | |
|---|---|---|---|
| 7,096,354 B2 | 8/2006 | Wheeler et al. | |
| 7,331,518 B2 | 2/2008 | Rable | |
| 7,447,784 B2 | 11/2008 | Eun | |
| 7,463,637 B2 | 12/2008 | Bou-Diab et al. | |
| 7,526,792 B2 | 4/2009 | Ross | |
| 7,562,382 B2 | 7/2009 | Hinton et al. | |
| 7,574,733 B2 | 8/2009 | Woodhill | |
| 7,711,122 B2 | 5/2010 | Allen et al. | |
| 7,953,979 B2 | 5/2011 | Borneman et al. | |
| 7,982,595 B2 | 7/2011 | Hanna et al. | |
| 8,028,329 B2 | 9/2011 | Whitcomb | |
| 8,136,148 B1 | 3/2012 | Chayanam et al. | |
| 8,161,527 B2 | 4/2012 | Curren | |
| 8,200,980 B1 | 6/2012 | Robinson et al. | |
| 8,245,044 B2 | 8/2012 | Kang | |
| 8,332,627 B1 | 12/2012 | Matthews et al. | |
| 8,335,933 B2 | 12/2012 | Humphrey et al. | |
| 8,397,301 B2 | 3/2013 | Hering et al. | |
| 8,402,526 B2 | 3/2013 | Ahn | |
| 8,458,798 B2 | 6/2013 | Williams et al. | |
| 8,495,720 B2 | 7/2013 | Counterman | |
| 8,499,339 B2 | 7/2013 | Chao et al. | |
| 8,538,028 B2 | 9/2013 | Yeap et al. | |
| 8,539,567 B1 * | 9/2013 | Logue | H04L 63/0884 709/223 |
| 8,627,438 B1 | 1/2014 | Bhimanaik | |
| 8,646,086 B2 | 2/2014 | Chakra et al. | |
| 8,689,287 B2 | 4/2014 | Bohmer et al. | |
| 8,700,729 B2 | 4/2014 | Dua | |
| 8,732,475 B2 | 5/2014 | Fahrny et al. | |
| 8,732,839 B2 | 5/2014 | Hohl | |
| 8,745,703 B2 | 6/2014 | Lambert et al. | |
| 8,763,077 B2 | 6/2014 | Oberheide et al. | |
| 8,806,609 B2 | 8/2014 | Gladstone et al. | |
| 2,639,997 A1 | 9/2014 | Wiesmaier et al. | |
| 8,850,516 B1 | 9/2014 | Hrebicek et al. | |
| 8,893,230 B2 | 11/2014 | Oberheide et al. | |
| 8,898,762 B2 | 11/2014 | Kang | |
| 2002/0123967 A1 | 9/2002 | Wang | |
| 2003/0115452 A1 | 6/2003 | Sandhu et al. | |
| 2003/0126472 A1 | 7/2003 | Banzhof | |
| 2003/0147536 A1 | 8/2003 | Andivahis et al. | |
| 2004/0064706 A1 | 4/2004 | Lin et al. | |
| 2005/0218215 A1 | 10/2005 | Lauden | |
| 2005/0221268 A1 | 10/2005 | Chaar et al. | |
| 2005/0268107 A1 | 12/2005 | Harris et al. | |
| 2006/0130139 A1 | 6/2006 | Sobel et al. | |
| 2006/0165060 A1 * | 7/2006 | Dua | G06Q 20/20 370/352 |
| 2006/0182276 A1 | 8/2006 | Sandhu et al. | |
| 2006/0242692 A1 | 10/2006 | Thione et al. | |
| 2007/0199060 A1 | 8/2007 | Touboul | |
| 2007/0228148 A1 | 10/2007 | Rable | |
| 2007/0250914 A1 | 10/2007 | Fazal | |
| 2007/0284429 A1 | 12/2007 | Beeman | |
| 2008/0049642 A1 | 2/2008 | Gudipudi et al. | |
| 2008/0120411 A1 | 5/2008 | Eberle | |
| 2009/0055906 A1 | 2/2009 | Wendorff | |
| 2009/0187986 A1 | 7/2009 | Ozeki | |
| 2009/0300596 A1 | 12/2009 | Tyhurst et al. | |
| 2009/0300707 A1 | 12/2009 | Garimella et al. | |
| 2010/0042954 A1 | 2/2010 | Rosenblatt et al. | |
| 2010/0069104 A1 | 3/2010 | Neil et al. | |
| 2010/0114740 A1 | 5/2010 | Dominguez et al. | |
| 2010/0115578 A1 | 5/2010 | Nice et al. | |
| 2010/0121767 A1 | 5/2010 | Coulter et al. | |
| 2010/0125737 A1 | 5/2010 | Kang | |
| 2010/0180001 A1 | 7/2010 | Hardt | |
| 2010/0202609 A1 | 8/2010 | Sandhu et al. | |
| 2010/0216425 A1 | 8/2010 | Smith | |
| 2010/0217986 A1 | 8/2010 | Schneider | |
| 2010/0233996 A1 | 9/2010 | Herz et al. | |
| 2010/0257610 A1 | 10/2010 | Hohl | |
| 2010/0330969 A1 | 12/2010 | Kim et al. | |
| 2011/0026716 A1 | 2/2011 | Tang et al. | |
| 2011/0086616 A1 | 4/2011 | Brand et al. | |
| 2011/0107389 A1 | 5/2011 | Chakarapani | |
| 2011/0138469 A1 | 6/2011 | Ye et al. | |
| 2011/0197267 A1 | 8/2011 | Gravel et al. | |
| 2011/0219449 A1 | 9/2011 | St. Neitzel et al. | |
| 2011/0277025 A1 | 11/2011 | Counterman | |
| 2011/0302410 A1 | 12/2011 | Clarke et al. | |
| 2011/0302630 A1 * | 12/2011 | Nair | G06F 21/41 726/4 |
| 2012/0090028 A1 | 4/2012 | Lapsley et al. | |
| 2012/0096274 A1 | 4/2012 | Campagna et al. | |
| 2012/0198050 A1 | 8/2012 | Maki et al. | |
| 2012/0216239 A1 | 8/2012 | Yadav et al. | |
| 2012/0227098 A1 | 9/2012 | Obasanjo et al. | |
| 2012/0300931 A1 | 11/2012 | Ollikainen et al. | |
| 2013/0042002 A1 | 2/2013 | Cheeniyil et al. | |
| 2013/0060708 A1 * | 3/2013 | Oskolkov | G06Q 20/3223 705/75 |
| 2013/0081101 A1 | 3/2013 | Baer et al. | |
| 2013/0097585 A1 | 4/2013 | Jentsch et al. | |
| 2013/0110676 A1 | 5/2013 | Kobres | |
| 2013/0125226 A1 | 5/2013 | Shah et al. | |
| 2013/0174246 A1 | 7/2013 | Schrecker et al. | |
| 2013/0179681 A1 | 7/2013 | Benson et al. | |
| 2013/0326493 A1 | 12/2013 | Poonamalli et al. | |
| 2014/0047546 A1 | 2/2014 | Sidagni | |
| 2014/0188796 A1 | 7/2014 | Fushman et al. | |
| 2014/0208405 A1 | 7/2014 | Hashai | |
| 2014/0235230 A1 | 8/2014 | Raleigh | |
| 2014/0237236 A1 * | 8/2014 | Kalinichenko | G06F 21/43 713/168 |
| 2014/0245278 A1 | 8/2014 | Zellen | |
| 2014/0351954 A1 | 11/2014 | Brownell et al. | |
| 2015/0012914 A1 | 1/2015 | Klein et al. | |

OTHER PUBLICATIONS

Symantec, Administration Guide for Symantec TM Endpoint Protection and Symantec Network Access Control, Aug. 1, 2007.
Symantec, Administration guide for symantec Endpoint protection and symantec network access control, 2009, version 11.00.05.00.

* cited by examiner

SYSTEM AND METHOD FOR VERIFYING STATUS OF AN AUTHENTICATION DEVICE

CROSS-REFERENCE TO RELATED APPLICATIONS

This application is a continuation of U.S. patent application Ser. No. 14/455,630, filed on 8 Aug. 2014, which claims the benefit of U.S. Provisional Application Ser. No. 61/863,826, filed on 8 Aug. 2013, both of which are incorporated in their entireties by this reference.

This application is a continuation of U.S. patent application Ser. No. 14/188,480, filed on 24 Feb. 2014, which claims the benefit of U.S. Provisional Application Ser. No. 61/768,248, filed on 22 Feb. 2013, both of which are incorporated in their entireties by this reference.

TECHNICAL FIELD

This invention relates generally to the authentication field, and more specifically to a new and useful system and method for verifying status of an authentication device in the authentication field.

BACKGROUND

With increasing computing capabilities and more and more services moving online, security has become increasingly important. Username and password serves as a base level of authentication security, but services are now moving to two-factor authentication, token based authentication, and/or alternative forms of authentication. Using not only what a user knows as an authentication layer (e.g., a username and password), but also what the user has (e.g., two-factor authentication and token authentication), has seen increase popularity with smart phones and other mobile computing devices. Two-factor authentication, in particular, can involve a phone or device to be registered to a particular user.

Two-factor authentication can involve enrolling a device to be used as an authentication device, such as a mobile phone. In some cases, the authentication can be tied to an authentication application on that device. However, without that device, a legitimate user loses the ability to be authorized. If a phone is lost or an authorization application is uninstalled, a new authentication device may need to be re-enrolled. This process can be cumbersome and potentially a security threat. In one possible option, re-enrolling can require contacting an IT admin to change the device. However, this process cannot only be slow and inconvenient but is vulnerable to social engineering forms of exploitation. Another form of re-enrollment might be to use a pin code to re-enroll the device/application, but then this pin code becomes a vulnerability to the authentication security. Thus, there is a need in the authentication field to create a new and useful system and method for verifying status of an authentication device. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Verifying Status of an Authentication Device

Figure 1:
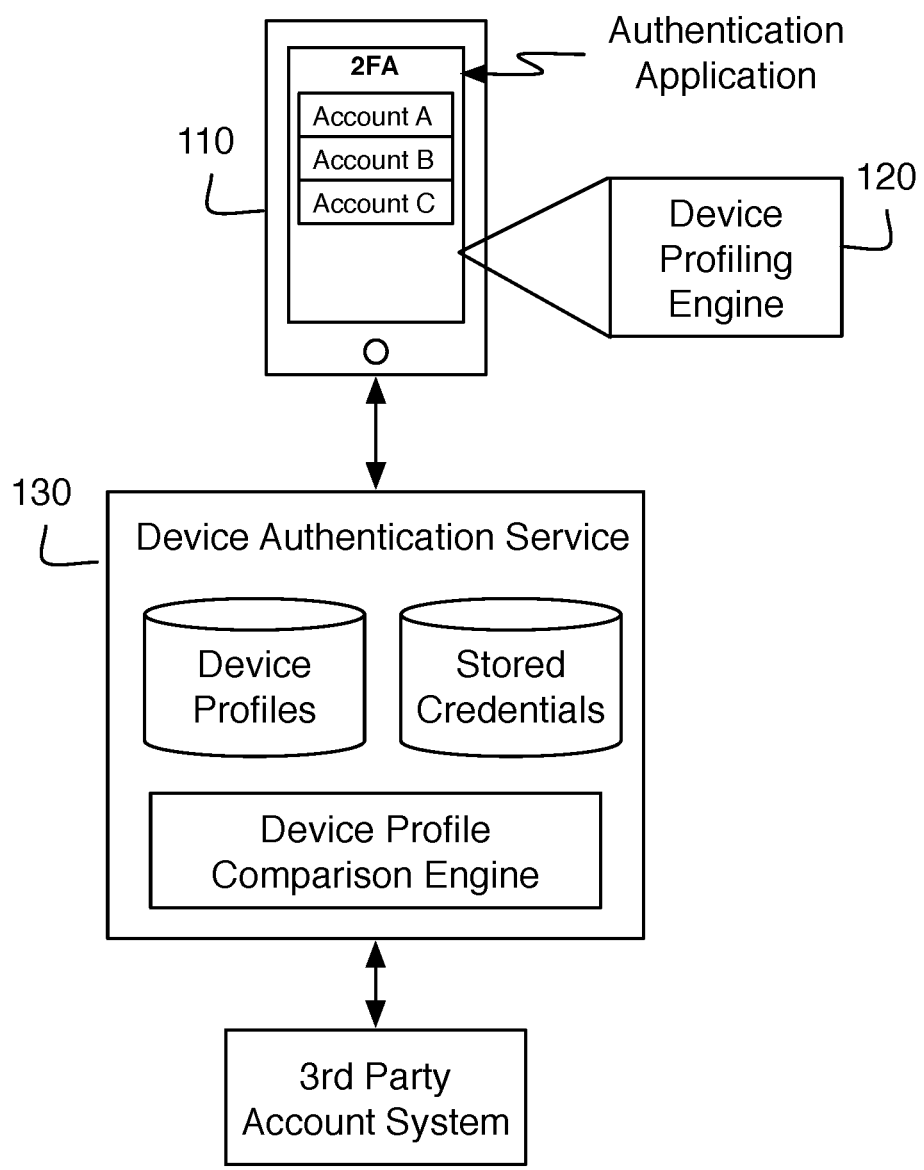
FIG. 1 is schematic representation of a system of a preferred embodiment.

As shown in FIG. 1, a system for verifying status of an authentication device of a preferred embodiment can include an authentication application 110, a device profiling engine 120, and a device authentication service 130. The system functions to use device configuration characteristics to create a digital finger print of a device used in two-factor authentication. The digital fingerprint (i.e., device profile) is preferably used when re-enrolling a device. Re-enrolling of a device is frequently performed when a user loses a device, changes phone numbers, clears the configuration of an application, reinstalls an application, updates an application, or somehow breaks the mechanism to link the device/application with an account. The system can similarly be used when enrolling an additional authentication application (on the same or a different device). The device profile can be used as a signature that persists across many of these actions on the device and can be used to verify, re-enroll a device/application, and/or to provide an additional factor of authentication. The digital fingerprint is preferably based on one or more factors that are substantially independent of the configuration or state of an authentication application 110.

The system is preferably used in combination with a two-factor authentication (2FA) service, and more preferably a 2FA system that leverages a mobile computing device as the second factor of authentication. Herein 2FA is used as a primary example of application, but it could be readily understood that the number of factors of authentication can be greater than two (i.e., can be multi-factor authentication). The system is configured to enable improved recovery of the second form of authentication—the authentication application 110 or the device. Phones and tablets can be an ideal form of a second factor of authentication. The 2FA can be used with any suitable computing device however, such as a desktop computer, a media player device for a TV, a gaming system, a wearable computer, or any suitable computing device. The devices are readily available and provide an out of band channel for a user to verify an authentication attempt. A device or more specifically an authentication application 110 can be described as an authentication device instance. The authentication device instance can provide a "what you have" layer of security for authentication and/or authorization. In some variations, users register accounts to use the authentication device instance in a 2FA. When trying to login for the registered account a push notification can be sent to the authentication device instance. In another variation, registering an account sets up one-time passwords (OTP) on the authentication device instance. The authentication device instance can enable access to the OTPs. In another variation, login codes can be transmitted to authentication device instance. The use of a device profile signatures can extend this notion of "what you have" layer to be a "what your device is" element of the "what you have" layer of security.

As more 2FA systems rely on mobile devices as a form of authentication, the loss of a 2FA device or application can cause many issues, which the system improves. One benefit of the system is that it can be used to ease the enrollment process of devices. This system enables a secure recovery of an authentication mechanism. The system extends the notion of "what your device is" beyond simple physical addressing identification to include notions of how that device is uniquely setup and/or used by a particular user.

The system and the device profile can alternatively be applied to authenticating a device for other use-cases such as using the device profile as an additional factor of authentication.

The authentication application 110 of the preferred embodiment functions as a component enabling a device to be used as a 2FA mechanism. In a first variation, the 2FA process occurs within the application. The authentication application 110 can receive push notifications, alert a user, and receive the 2FA confirmation within the authentication application no. The authentication application no is preferably associated with at least one account with 2FA. Often, an account will set up a username password and set 2FA to be used with the account. The user will complete an enrollment process to associate the device with the account. Subsequently, when a user tries to log in with his username and password of an account on an associated service, the authentication application 110 is notified and confirmation has to be completed through the application. For example, a user attempts to login to a web service on a browser (on a different device or in a different application), that web service can initiate an authentication process that will depend on some user interaction with the authentication application 110 (e.g., entering a code obtained from the application or completing some action from within the application). In one variation, an authentication application 110 can be used with the authentication of a plurality of different accounts on different outside service.

The authentication application 110 can alternatively be associated with a single account system, and the application can have additional functionality not related to authentication. For example, a social network can use a social network app as a channel through which 2FA is invoked. When a user tries to login or perform a restricted action (e.g., authorize access to data by an outside application), the social network app can be used to facilitate completion of that process. The authentication application no can alternatively be associated with multiple account systems. In this variation, the authentication application no can be customized for use with a variety of different accounts with 2FA. The authentication application no will preferably include a set of credentials for the various account systems. This set of credentials can include signatures, keys, tokens, and other parameters that are used as security measures during authentication. If the device is lost or the application data is deleted, such credentials may be lost as well. The set of credentials can be backed up in the device authentication service 130.

The system and methods of preferred embodiments may alternatively not be used for two-factor authentication, but used for any use-case of credential or account recovery. For example, credentials setup for the primary authentication of an application (e.g., as in a mobile-first application), can be reestablished through the system and method. In one variation, a user may not be required to provide account username and password for an application that was previously setup. The device profiling approach of the system and method can be used to validate the user and/or device match and that credentials can be restored.

In one variation, the authentication application no may not be used for completing the 2FA but is used to facilitate generation and submission of a device profile. In this variation, the authentication application no is used during the enrollment process of a new device. For example, if 2FA is completed by sending pin codes over SMS to a phone number, the authentication application no is preferably used in profiling a device when setting up a new phone number. Subsequent 2FA operations can be completed through SMS or other outside applications on the device. In one exemplary use case scenario, a social network may want to use 2FA over SMS. When enrolling/registering a device for use with 2FA, a corresponding social network application may explicitly or transparently create a device profile. Use of the social network application can periodically update the device profile (which can be confirmed to be the same), and changes in the device profile may result in invalidating use of SMS for authentication. Since many properties of a phone may stay the same even if a phone number changes, the authentication application 110 can facilitate verifying that the user of the device corresponds to the previous device profile. The authentication application no can additionally include a device profiling engine 120.

The device profiling engine 120 of the preferred embodiment functions to create a digital fingerprint of the device. A device profile engine preferably accesses information from the device that creates a unique fingerprint of the device. The device profile is preferably substantially unique to the device and user. The device profile may not enable uniquely identifying a user but the device profile can provide a secure token, key, or signature that relates to which device a user users. In many cases, a device profile is not a single identifying mechanism, but can be compared and correlated to other substantially similar device profiles. For example, a particular device profile may depend on when and what specific data is collected, but it may fulfill a device profile match when substantial overlap or matching conditions are satisfied. In another variation, the device profile can be a digital fingerprint or composite single entity, which can be a hash of a collection of specific data. A uniquely identifying device profile or fingerprint may depend on more limited data collection because the hashing may be used to create a one to one mapping of device profile fingerprints. The device profiling engine 120 preferably collects information from the device and then forms that information into a signature that characterizes the device. The signature is preferably a data object with structured/readable and/or cryptographic representation of one or more device information signals.

Figure 2:
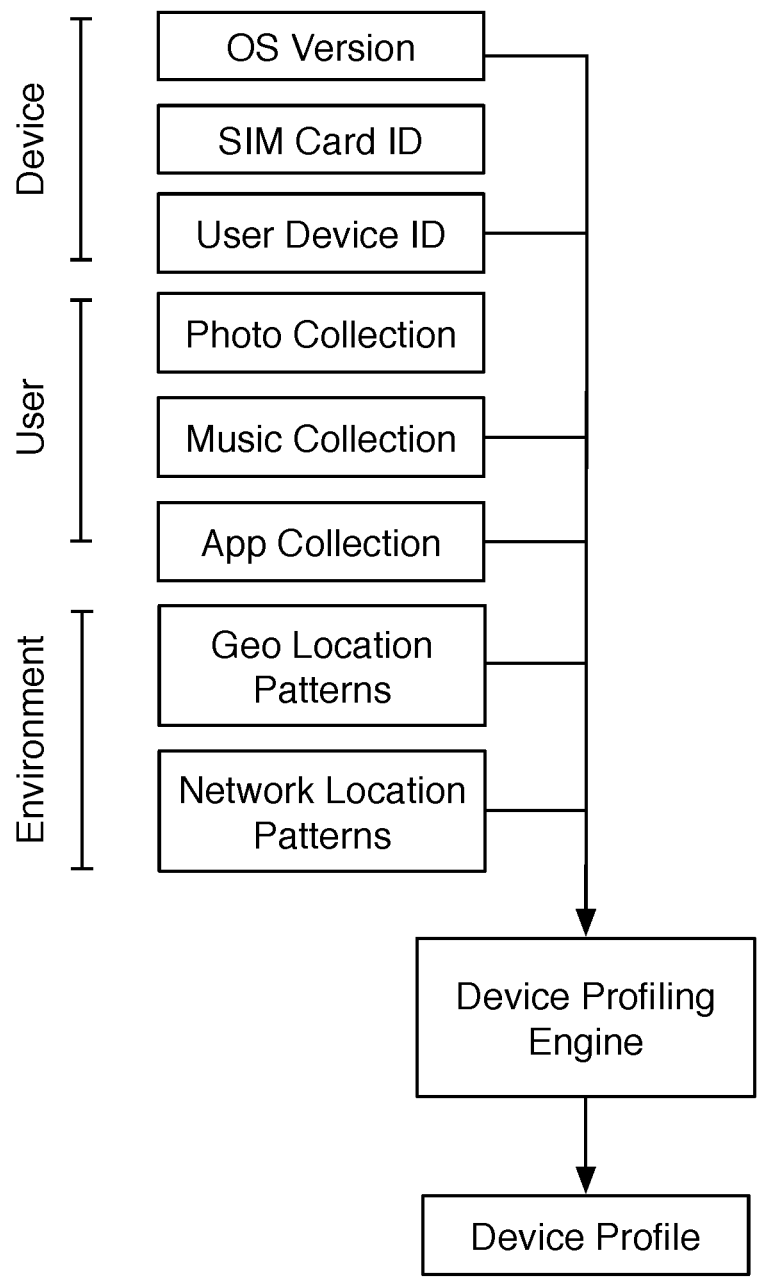
FIG. 2 is a schematic representation of a device profile and contributing components.

There are preferably multiple different profile vectors that contribute to the device profiling. The information can relate to intrinsic properties or configurations of the device, but can additionally include information that relates to the manner of usage, settings, preferences, and/or environmental aspects of a user as shown in FIG. 2. The intrinsic properties can be attributes readily accessed of the device. The device profile engine can access the device operating system version, component versions (e.g., library versions, service versions, device firmware versions, application versions, etc.), hardware properties, SIM card ID, UDID, application/advertiser ID, and other device properties. Such intrinsic properties can be influenced by user customization of a device (e.g., when and how often the user updates applications). For example, use of component version number information can be used as one signal. Component version numbers presumably stay the same or increase over time. Additionally, some component version numbers may be exclusively offered depending on hardware limitations. As an example of how the component version information can be used in identifying a corresponding device, a first device profile can be created and at a later time a second device profile can be created. The component version number signals can be compared and if the second device includes a portion of matching component versions and a portion of increasing component versions then that may signal that the first and second device profile are from the same device. If the second device profile includes a number of version numbers lower or low probability of occurring due to the ones indicated in the first device profile, then those discrepancies can signal the first and second device profiles are from different devices.

User customization vectors are device usage information that may be readily dependent on user generated content and behavior. In accessing user customization, permission may be granted to obtain location information, contact information, photos, videos, music, and other portions of a file system or application. A set of items, such as a music collection, provides a unique signature of who is using the device. For an attacker to target this portion of the device profile, the full music collection of a user would have to be simulated. In the case of a photo collection, the photos are highly unique and would be very difficult to replicate. Taking photo/video collection even further, facial recognition of people in the photos or videos can add another signal. The user customization vectors can include contact lists, location information, photo collections, video collections, music collections, application configuration information (e.g., stocks set in a stock app, cities set in a weather app), and other custom user data. Other user customization vectors can include user-specific information such as account meta data. A device may have one or more mechanisms for a user to provide identifying information, such as indicating a personal name used in a personal assistant service, or indicating what contact information is associated with the device (e.g., marking a contact as "me" explicitly or through use of the same phone number). In some devices, an operating system or application may provide the notion of accounts. For example, a user may set up a Google account, a Facebook account, and a Twitter account. The device profiling engine may enumerate through metadata related to configured device accounts. If a user has signed up for all their social media accounts, then that can provide a strong signal as to the identity of the user associated with the device.

The user customization vectors can additionally be used to verify identity when a device changes. User customization vectors can be preserved even if the device changes. For example, a user will update a new phone to use a backed up contact list, which can be used as a user customization vector in the device profile. In a first implementation, the device profiling engine 120 creates a device profile during the enrollment process to establish an initial reference device profile and will create a second device profile when re-enrolling to verify that the device profiles correspond. In an alternative implementation, the reference device profile is periodically updated to stay up to date and/or to add another layer of authentication.

Related to user customization vectors, usage patterns of a device can similarly provide user influenced device profile vectors. Usage patterns function to capture the operational environment conditions frequently experienced by a user. Such usage patterns may be collected over a certain window of time. Usage patterns can include monitoring and collecting data relating to frequently contacted contacts, frequently used apps, frequently played media, frequently visited websites, and other device usage aspects. Usage patterns can additionally relate to outside operating environmental signals which are influenced through how a user uses a device such as usage according to time of day, geographical location patterns, used/observed WiFi or communication networks, observed nearby peers or devices (e.g., Bluetooth devices, printers, sharable user phones/computers, etc.). Communication networks, can include Wifi networks, cell towers, GPS, and other wide range communication signals. As an example of nearby peers/devices, NFC tags, RFID tags, or other proximity communication beacons can be observed over time; the collected proximity signals are preferably influenced by who uses a device. Even after a user loses a phone, that user will still have the same daily routine and will trigger the same frequented proximity beacons.

The device authentication service 130 of the preferred embodiment functions as a remote service that can be communicatively coupled to the authentication application no. The device authentication service 130 is preferably remote or distinct from the device where the authentication application no is installed. The device authentication service 130 is preferably a central system that facilitates authentication and management of a plurality of authentication applications no. The device authentication service 130 is preferably hosted in a cloud distributed computing environment, but may alternatively be hosted in any suitable manner. The device authentication service 130 is preferably a multi-factor authentication service. In a preferred implementation, the device authentication service 130 functions as a web service to facilitate adding a second factor of authentication to an existing authentication system within an outside platform. For example, a website that enables user accounts to login with a username and password can integrate with the device authentication service 130 to simply add a second factor of authentication. The device authentication service 130 is preferably a remote cloud hosted system. The device authentication service 130 is preferably a multi-tenant application in that multiple users are configured to use the service for verifying at least the second factor of authentication.

The device can further be multi-tenant in that multiple outside services and platforms can use the service to augment their login system. For example, web platform A can use the device authentication service 130 for a set of their user accounts, while web service B can similarly share the use of the device authentication service 130 to provide 2FA for all of their user accounts.

Figure 3:
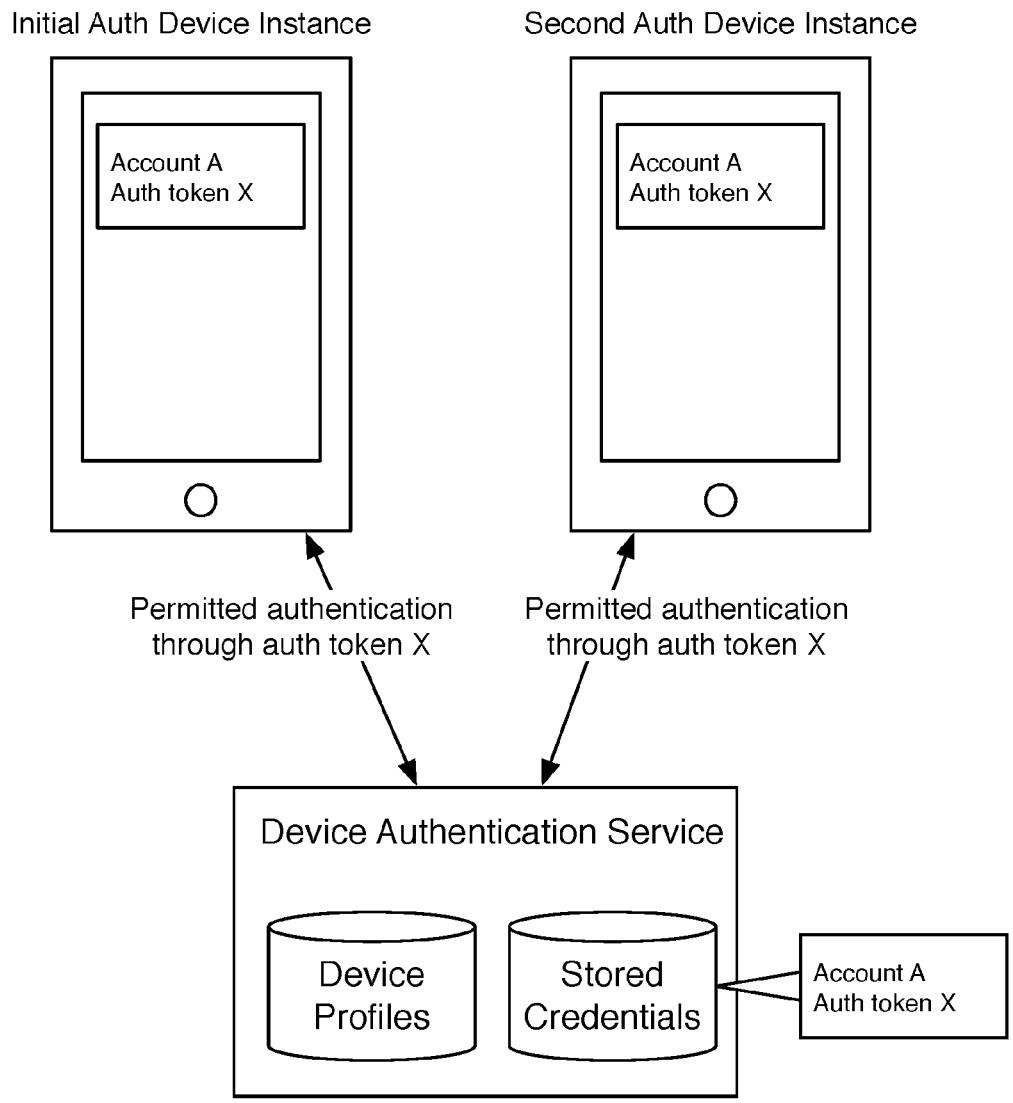
FIGS. 3-5 are schematic representation of variations on setting authentication credentials of a second authentication instance.
Figure 4:
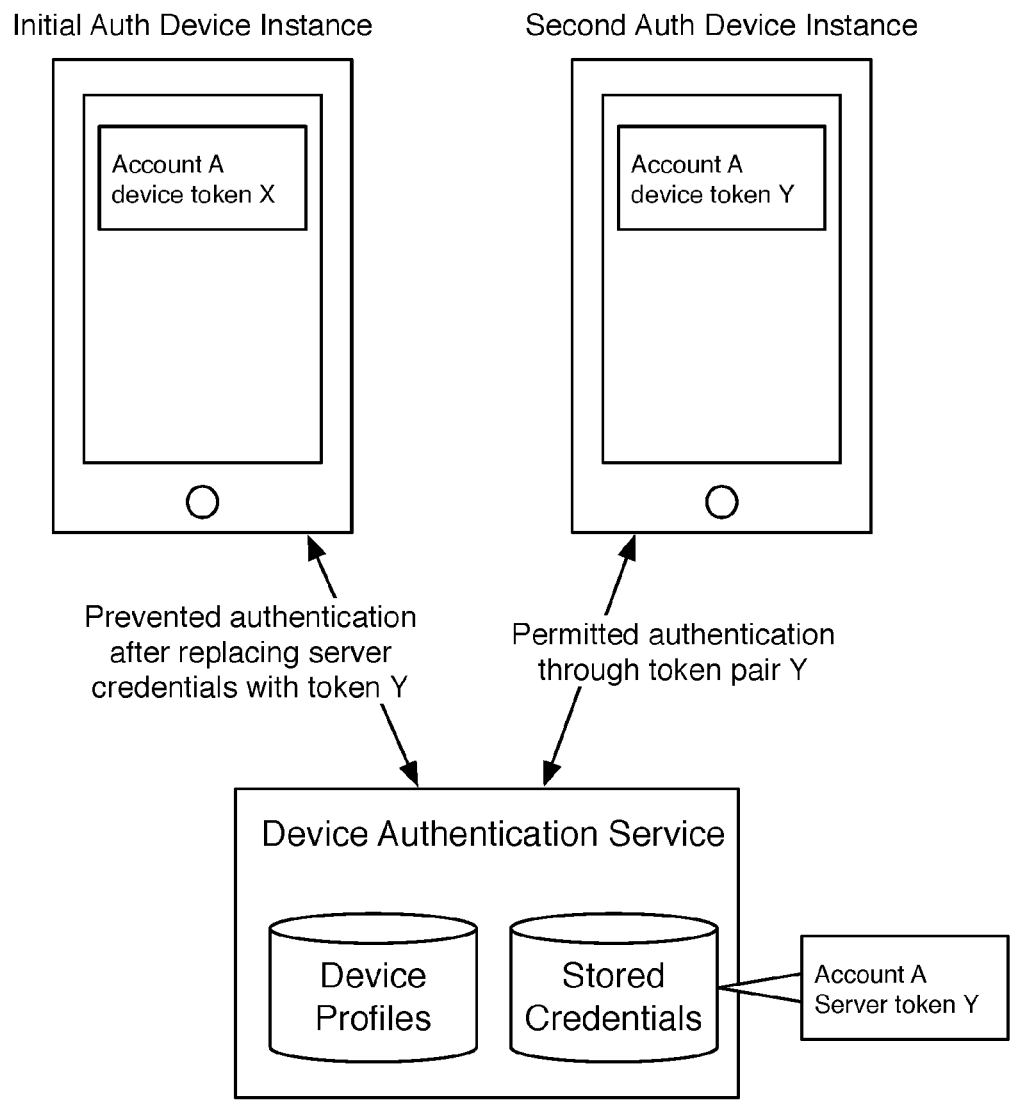
Figure 5:
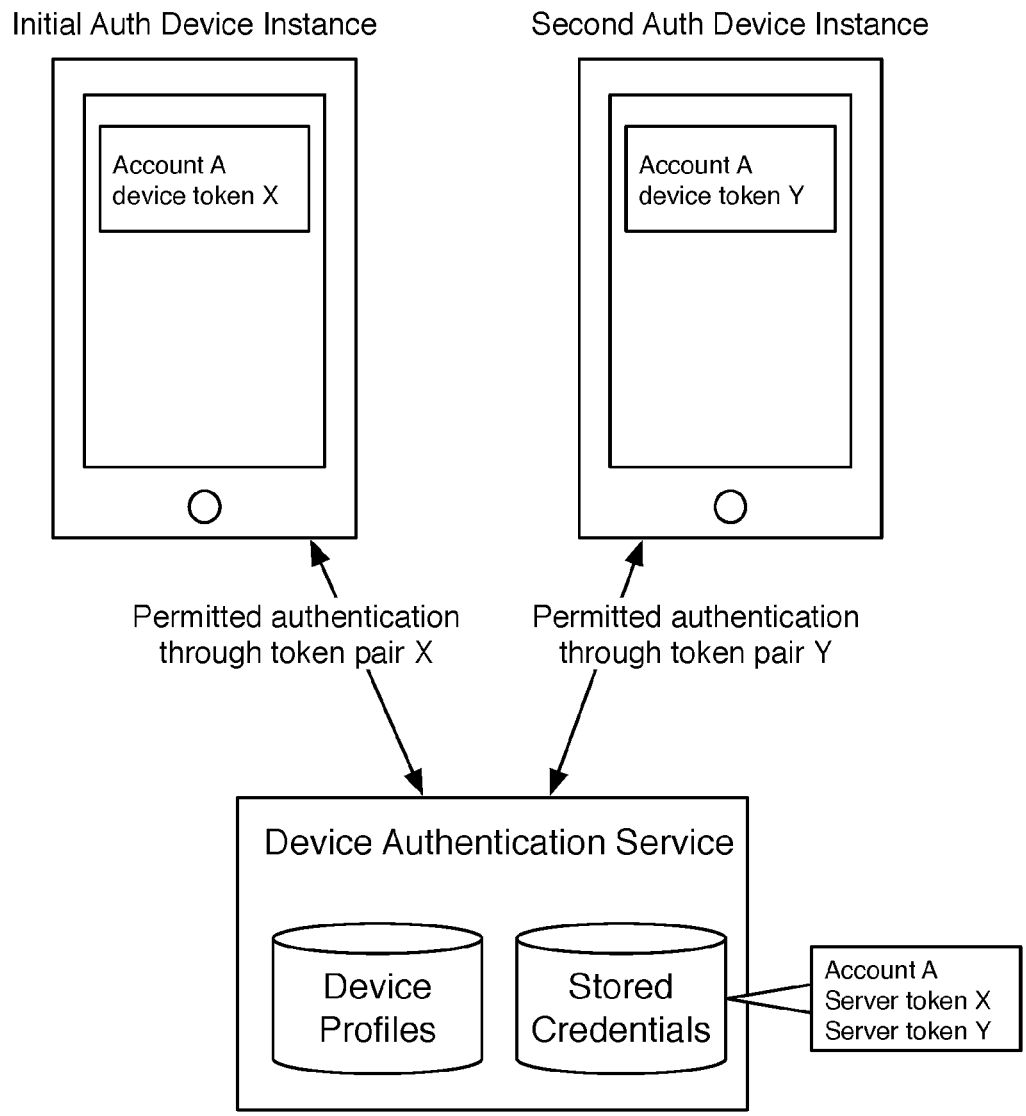

The device authentication service 130 preferably includes an account database that associates accounts with devices/applications used as the second factor of authentication. The records of the account database preferably include parameters that can be used to communicate with the device. The communication parameters can include the phone number, push notification identifier, or any suitable addressable identifier. Various authentication credentials can be stored so that authentication can be verified with the authentication application no. The device authentication service 130 preferably stores and/or manages credentials used in completing authentication with the 2FA. Authentication credentials such as shared secrets, some portion of a public/private key pair, tokens, OTP encryption key, or any suitable authentication credential used in verifying authentication confirmation of an authentication application no can be stored by the device authentication service 130. In some cases, the authentication credentials stored in the device authentication service 130 may include the tokens installed on the authentication application no. In this case, a new authentication application 110 instance can be setup after confirmation of a device profile by transmitting the stored authentication credentials to the new authentication application no as shown in FIG. 3. In another variation, the authentication credentials correspond to the server side version of the cryptographic credentials stored on the authentication application no. When setting up a new authentication application 110 (after confirming matching device profiles), the authentication credentials can be updated in the device authentication service 130 and synchronized with the new authentication application no instance, invalidating use of the previous authentication application no instance when clearing previous server credentials as shown in FIG. 4. In yet another variation, setting up a new authentication application no instance can set up a second set of authentication credentials such that both instances are kept operational as authentication devices as shown in FIG. 5.

Additionally, a record in the device authentication service 130 is associated with a device profile. The device profile is preferably added when creating the record (e.g., during enrollment), but the device profile can be added at any suitable time. Any suitable database or information architecture may be used to structure the information. The device profile can be used as an additional factor of authentication for actions such as re-enrollment.

The device authentication service 130 can additionally include a device profile comparison module. The device profile comparison module functions as a comparison engine to compare a stored device profile to a new device profile. The comparison module outputs a result that indicates if the device profiles correspond. The criteria for correspondence can include a match percentage, a likelihood of matching. In one variation, an administrator (e.g., a developer in a multitenant platform) using the device authentication service 130 may specify a policy for the matching. The policy may specify a threshold for a match. The policy may specify define a set of conditions that depend on multiple device profile vectors. The policy may additionally set different profiling levels for a type of request, account or other set of interactions. A profiling level can alter what type of second device profile is collected and/or used as described below. Depending on the information used in the device profile, an exact match may or may not be expected.

The device authentication service 130 can additionally include an application programming interface (API) or an alternative suitable integration mechanism such as a software development kit (SDK), libraries, and/or other suitable interface tool. The API can function to allow outside applications and services to interface and user the device authentication service 130 in combination with an internal authentication process. For example, an outside web platform may use an internal account username and password authentication process but make it dependent on successful completion of multi-factor authentication facilitated by the device authentication service 130. The outside web platform can use the API to communicate and integrate with the device authentication service 130. Alternatively, the device authentication service 130 can exist as a sub-system of a larger system such as a social network platform or an enterprise platform.

2. Method for Verifying Status of an Authentication Device

Figure 6:
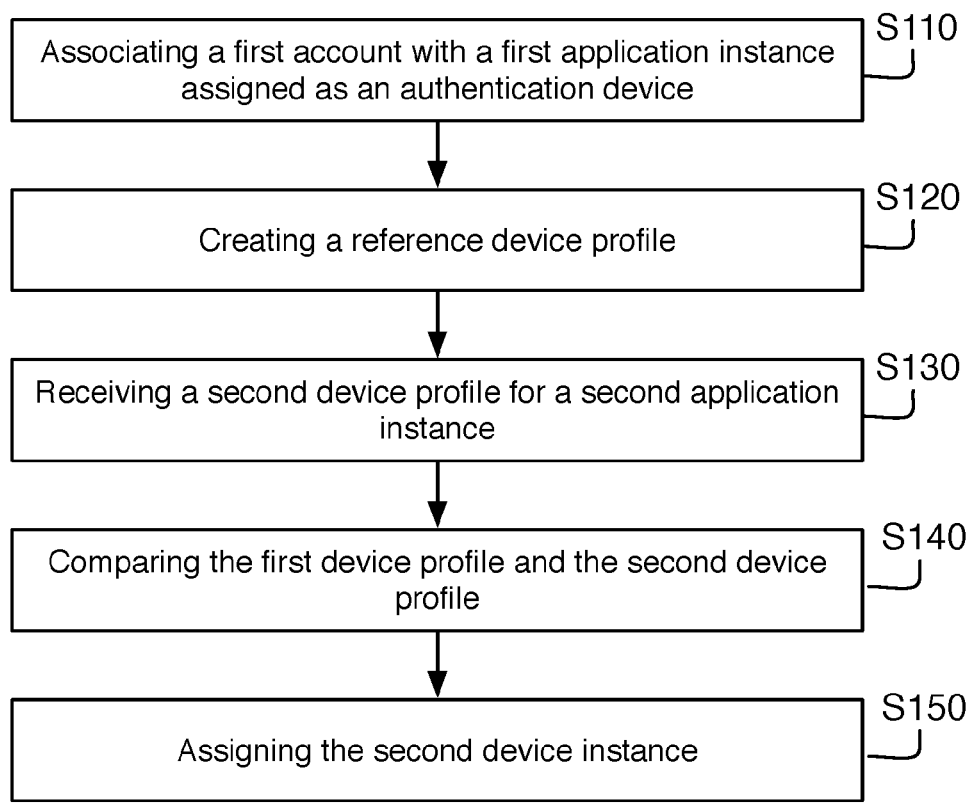
FIG. 6 is a flow diagram of a method of a preferred embodiment for assigning a second application instance.
Figure 7:
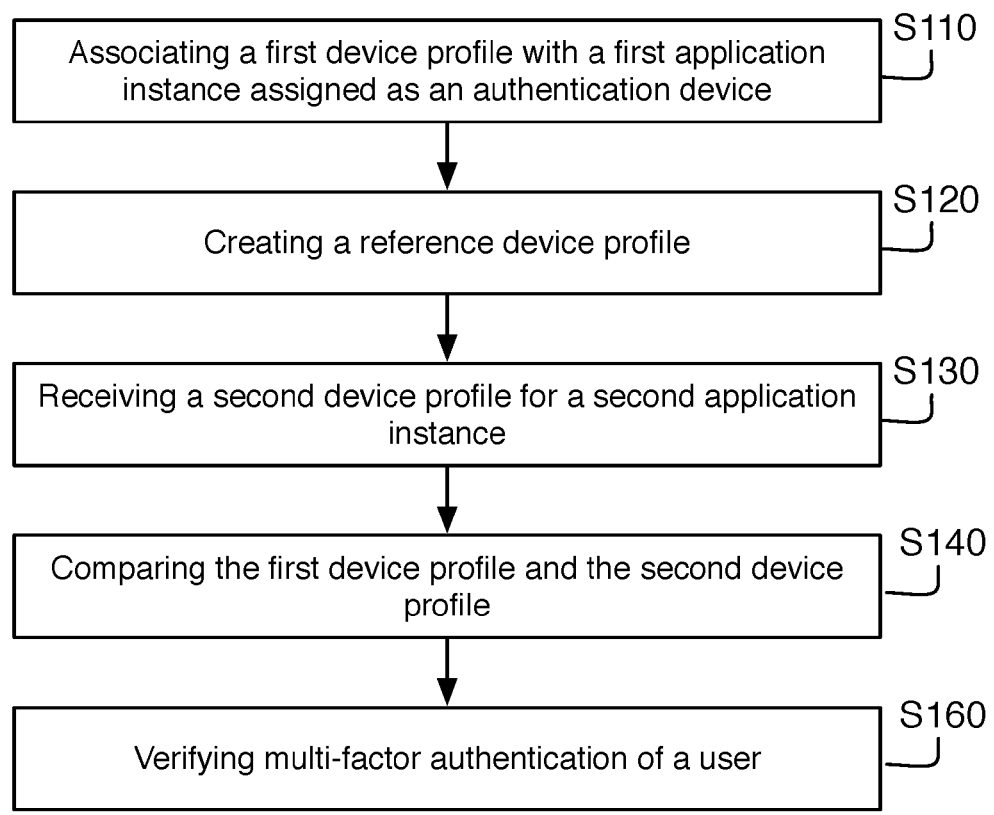
FIG. 7 is a flow diagram of a method of a preferred embodiment for authenticating a second application instance.
Figure 8:
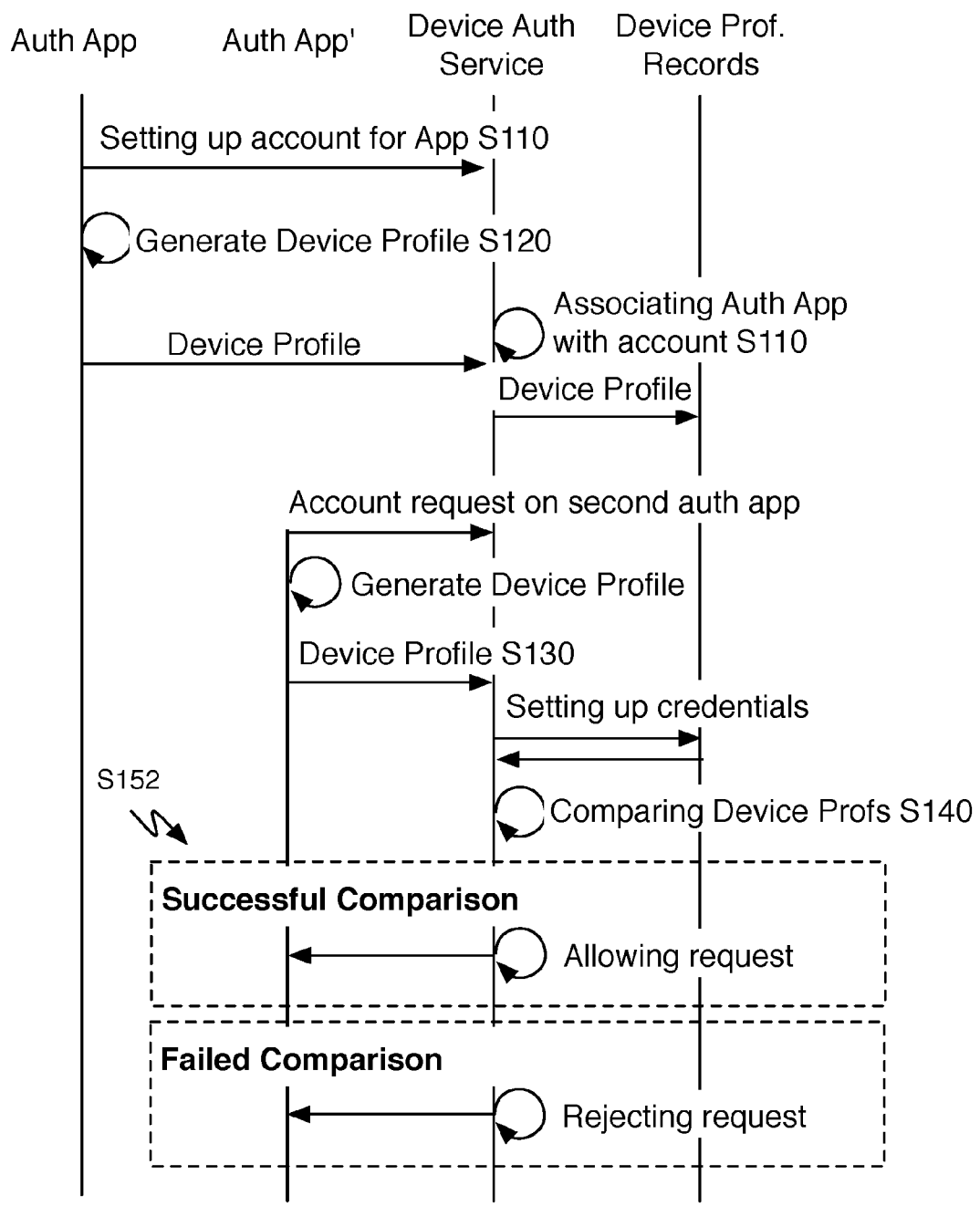
FIG. 8 is a communication flow diagram representation of a method of a preferred embodiment.

As shown in FIG. 6, a method for verifying status of an authentication device of a preferred embodiment includes associating a first account with a first application instance assigned as an authentication device S110, creating a reference device profile S120, receiving a second device profile for a second application instance S130, comparing the first device profile and the second device profile S140, and assigning the second application instance S150. An alternative embodiment can include verifying multi-factor authentication of a user S160 as shown in FIG. 7. The method can function to add automated checks when switching, recovering, adding, or even authenticating an authentication device as shown in FIG. 8. The use of an additional factor of authentication of this method can simplify the process of adding devices as multi-factor authentication devices. This can be beneficial in numerous scenarios.

In one scenario, a user may lose their phone, change phones, or accidentally uninstall an authentication application. The method enables the device fingerprint of a user to simplify the recovery process to re-enroll a new device or application instance. The ability to add or change an authentication device can be a security weakness in other authentication systems—an attacker may simply change the authentication device to his device. An authentication system may put several roadblocks, such as administrator approval and/or extra security checks, but the method of the preferred embodiment enables the change or update to an authentication application to be confidently updated with a device profile layer of protection. When applied to verifying updating of an authentication device instance, the method can include the initial set up of authentication credentials and then the establishment of authentication credentials with a second authentication device instance if the device profile comparison is confirmed to be successful (i.e., satisfy a condition of the device profiles matching), which functions to facilitate enrollment of a new authentication device instance.

Figure 9:
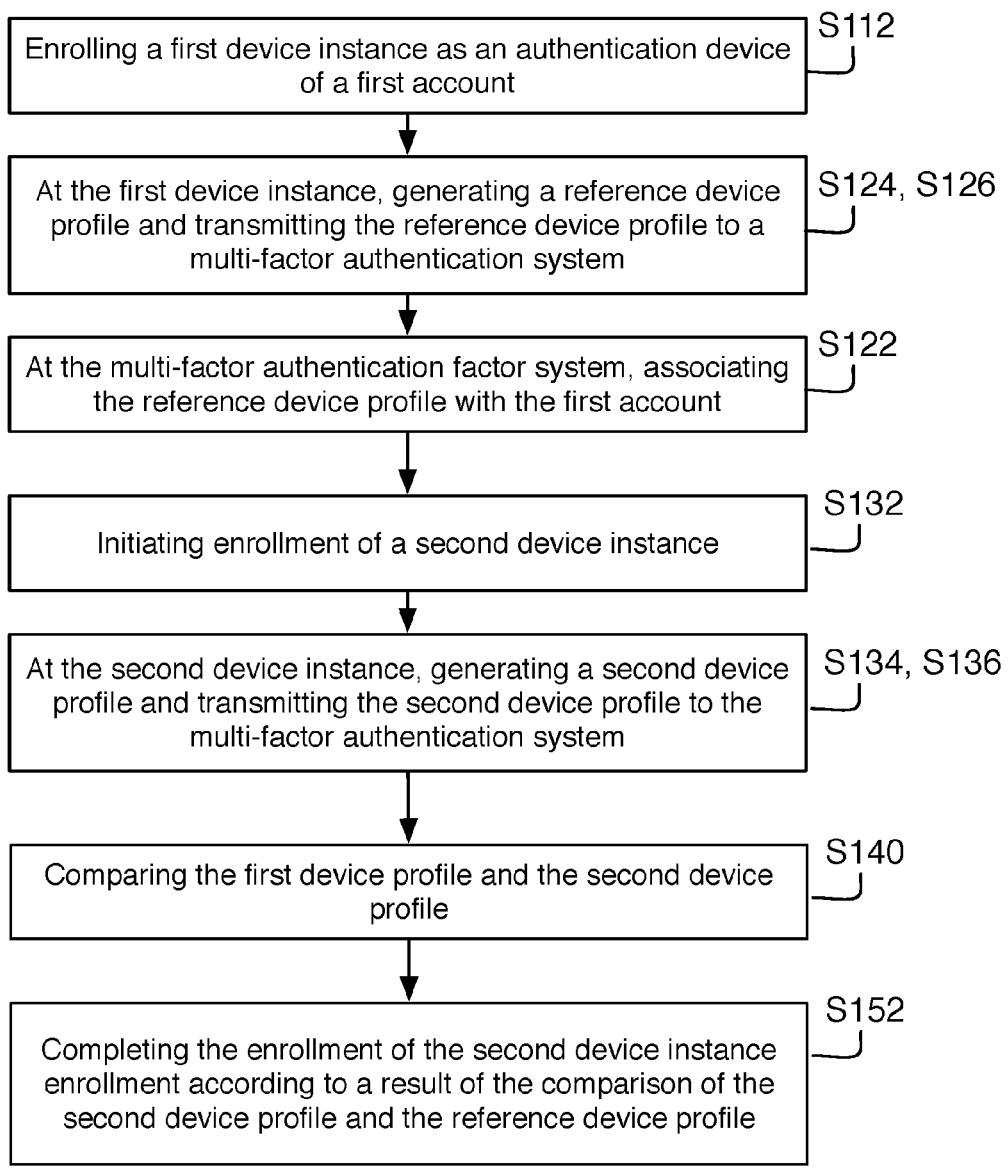
FIG. 9 is a flow diagram of a method of a preferred embodiment for enrolling a second application instance.
Figure 10:
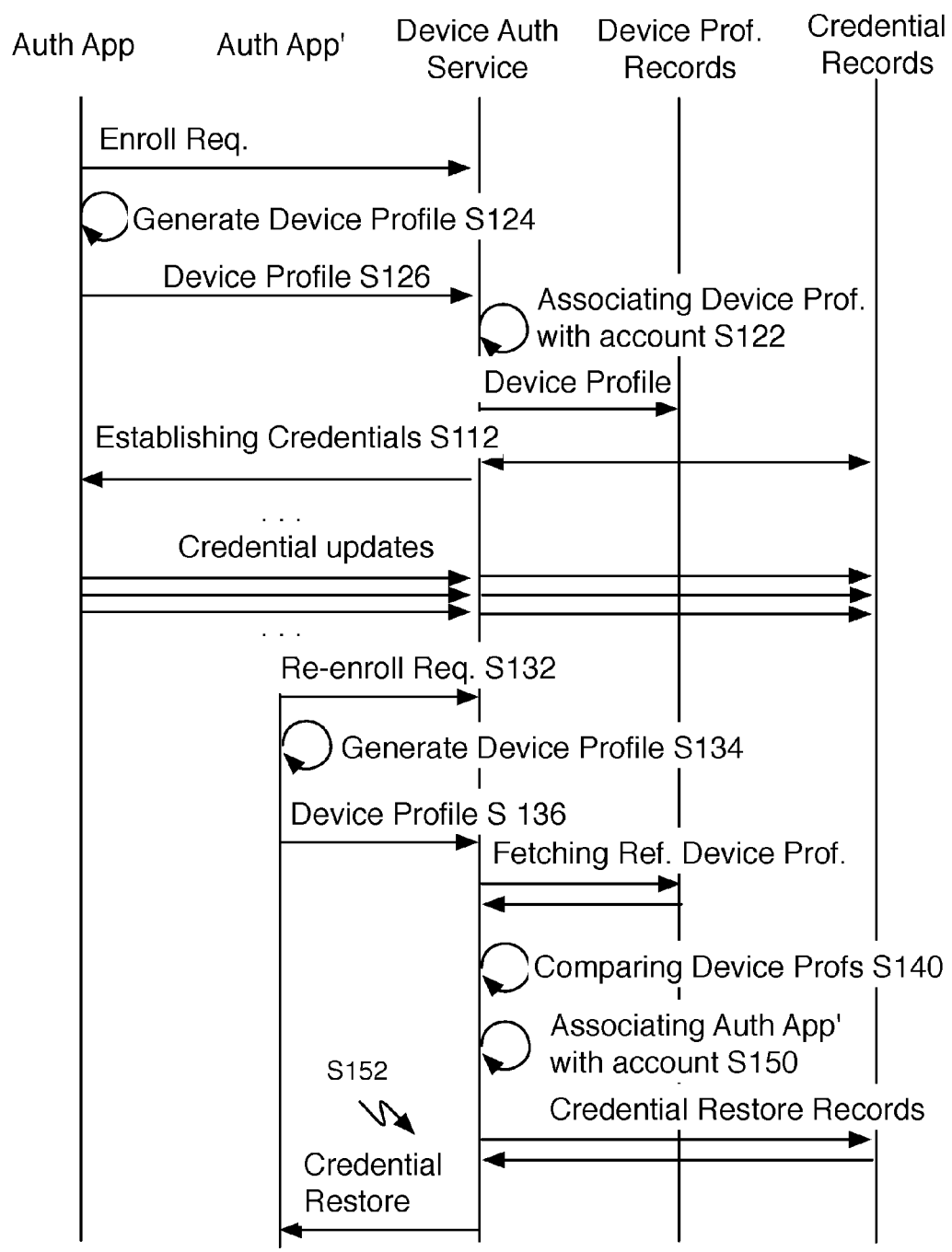
FIG. 10 is a communication flow diagram of a method of a preferred embodiment for enrolling a second application instance.

As shown in FIG. 9, one variation of a preferred embodiment for enrolling a second authentication device can include enrolling a first device instance as an authentication device of a first account S112; at the first device instance, generating a reference device profile S124 and transmitting the reference device profile to a multi-factor authentication system S126; at the multi-factor authentication factor system, associating the reference device profile with the first account S122; initiating enrollment of a second device instance S132; at the second device instance, generating a second device profile S134 and transmitting the second device profile to the multi-factor authentication system S136; comparing the reference device profile and the second device profile S140; and completing the enrollment of the second device instance enrollment according to a result of the comparison of the second device profile and the reference device profile S152. As shown in FIG. 10, credentials may be synchronized, reset, or otherwise established for a second authentication application.

Figure 11:
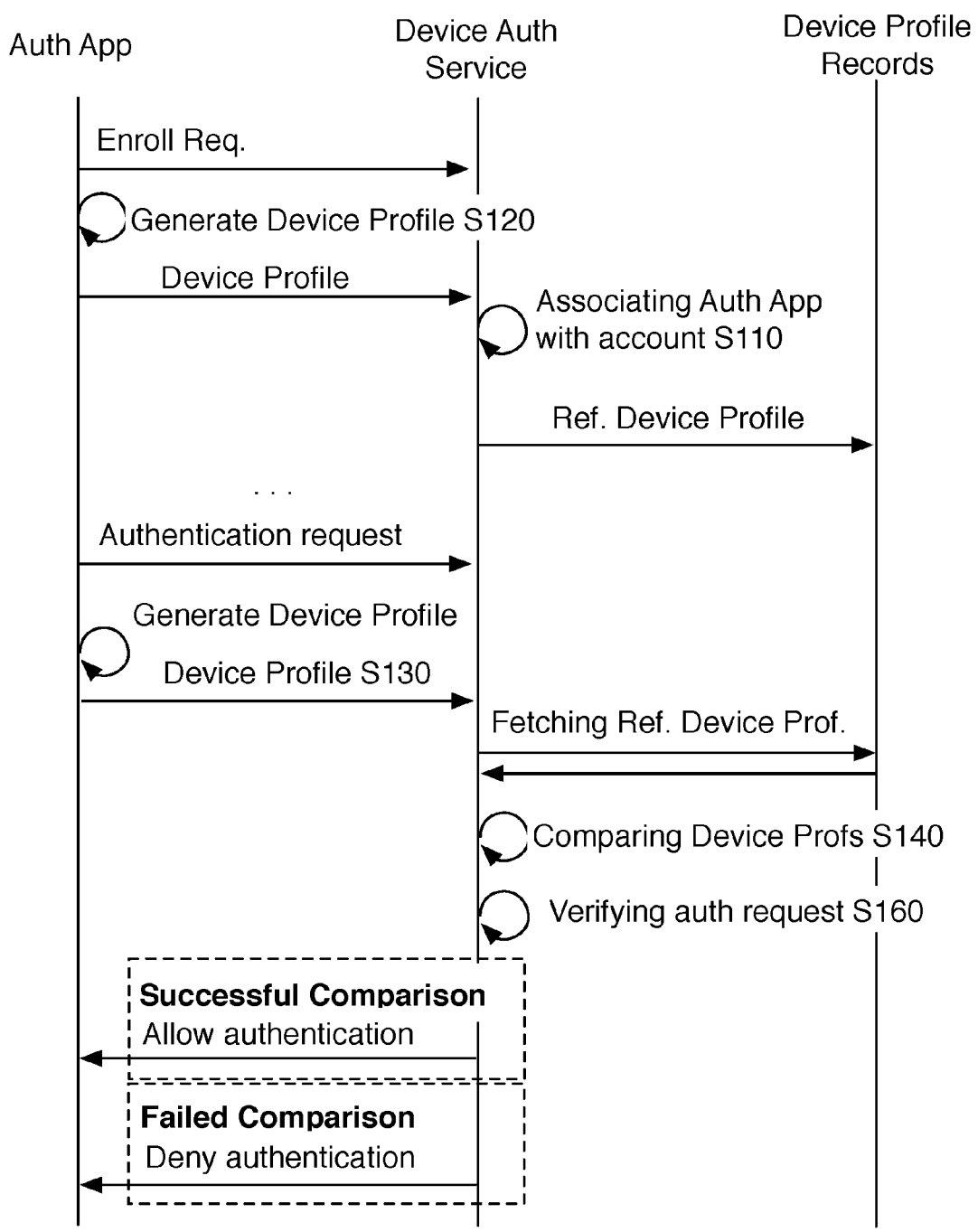
FIG. 11 is a communication flow diagram of a method of a preferred embodiment for authenticating an application instance.

In another implementation, the method can be applied to adding an additional factor of authentication. The device profile can be used as a second form of authentication when logging into a service or more preferably when providing an additional verification vector of the device as shown in FIG. 11. The device profile can serve as a device "biometric" factor of authentication that can supplement the "what you have" form of two factor authentication with the device. The method is preferably implemented by a 2FA system that facilitates 2FA authentication for multiple users. The 2FA is preferably a network-based service as described above. The method is preferably implemented by the system described above, but any suitable system can alternatively be used.

Alternatively, the method may be used to for authentication credential recovery for primary authentication credentials or any suitable tokens or credentials, not just for multi-authentication use cases. For example, credentials setup for the primary authentication of an application (e.g., as in a mobile-first application), can be reestablished through the method. In one variation, a user may not be required to provide account username and password for an application that was previously setup. The device profiling approach of the system and method can be used to validate the user and/or device match and that credentials can be restored.

Block S110, which includes associating a first account with a first application instance assigned as an authentication device, functions to establish a device as a factor of authentication. The device is preferably used as the possession factor of authentication within a 2FA system, but can be used in any suitable manner within an authentication system. The device profile is preferably associated with an account during the user account configuration process.

Figure 12:
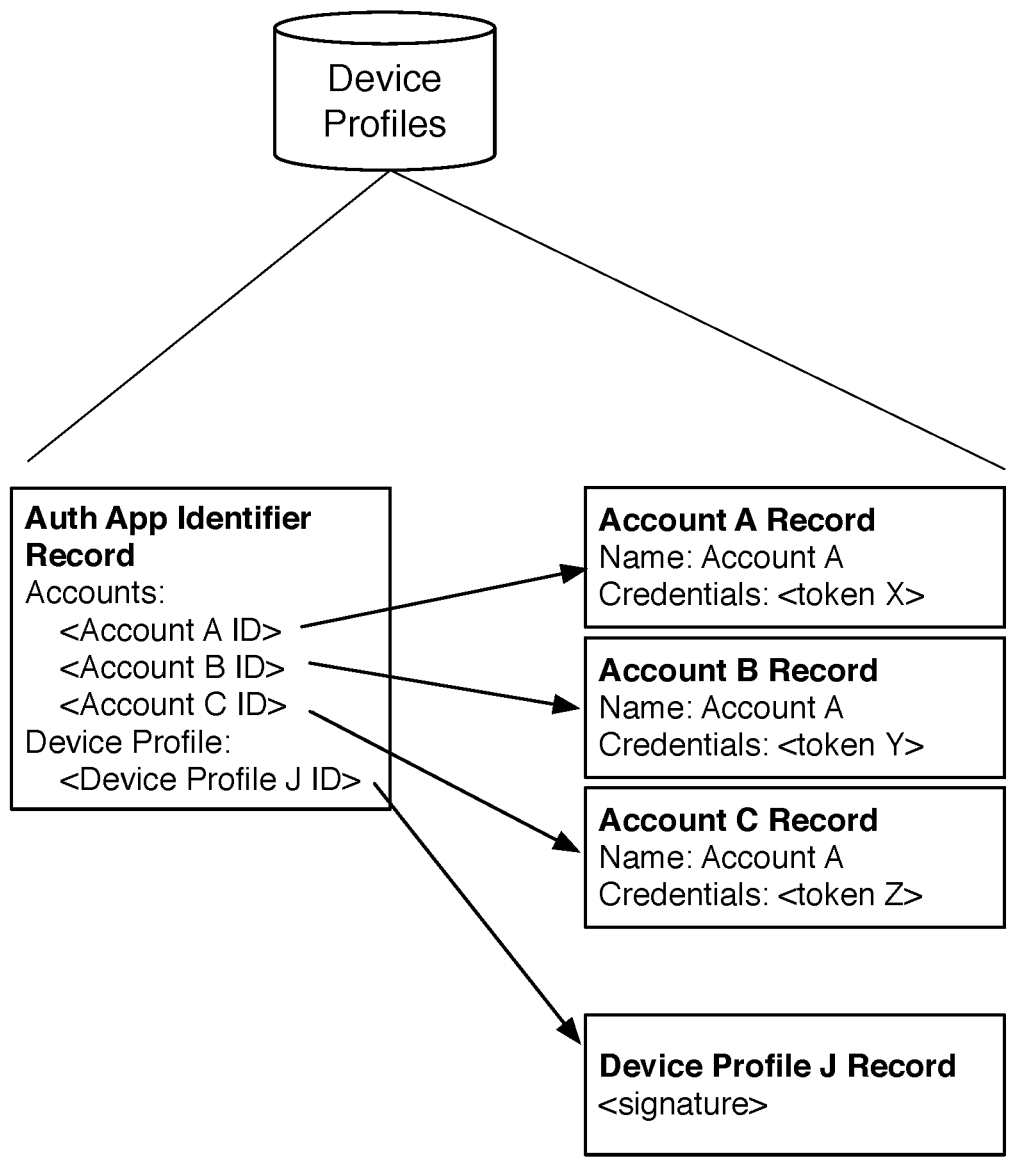
FIG. 12 is a schematic representation of an exemplary device profile mapping.

Associating a first account with a first application instance can include enrolling a first device instance as an authentication device of a first account S112, which may include receiving a device enrollment request, processing the request, and establishing the device as an authentication device. As described below, enrollment additionally includes associating a device profile with an account. The association of a device profile with a first account creates some stored mapping between one or more accounts of an authentication device as shown in FIG. 12. In one variation, the mapping is from an account to a device profile. If an enrollment request or authentication request is received for a particular account, a corresponding device profile can be identified. In another variation, the mapping is from a particular authentication device identifier and a device profile. The authentication device identifier may additionally be associated with a set of accounts (such that the device profile and the first account are associated through the authentication application identifier). An authentication identifier may be a unique token, but may alternatively be an endpoint identifier such as a telephone number, or other suitable endpoint.

When a user signs up for a 2FA system, the user will often be prompted to provide user credential information such as a username and password as well as configure a device for authentication. Configuring a device for authentication can involve downloading a special authentication application or configuring a device instance for use as an authentication device. In one variation, a user-installed authentication application is used. In another variation, the operating system of a device provides an authentication service layer to be used with the device. In one implementation, an application on a mobile device is used by a 2FA system to push authentication requests as the second factor of authentication. Thus, during enrollment, the 2FA associates the installed application instance with the corresponding account so that push notifications can be delivered to the correct application.

Additionally, authentication credentials, tokens, certificates, or other security based items can be generated or delivered for local storage on the authentication device. Associating a first account can include establishing a set of authentication credentials on the first device instance and storing a corresponding set of authentication credentials in the multi-factor authentication system. In one variation, the authentication credentials are shared and the remote device authentication system will store the same set of credentials stored on the first device instance. In a second variation, the authentication credentials are asymmetric and the credentials stored in the remote device authentication system will correspond to the credentials stored on the first device instance. For example, a private key stored on the first device instance can correspond to the public key stored in the device authentication system.

In one variation, when the credentials are shared from the device to the device authentication system for remote storage, the credentials may be encrypted using a pin or password on t first device instance. And the encrypted authentication credentials are shared and stored in the device authentication system, which functions to remotely store the credentials but to prevent the device authentication system from inspecting or having access of the credentials, such as if the system was compromised. When the stored device credentials are shared with a second device instance, the second device instance collects a pin from a user and uses that pin to decrypt the encrypted credentials.

A single application can be used as an authentication application for multiple accounts of a user. In another variation, configuring a device may include providing the 2FA system with a phone number. To verify the device, a test message may be delivered with a code, which a user then confirms via another interface (e.g., a web form). The use of an authentication device through an outside communication channel can be an example of where the authentication application provides only device profiling services. For example, when 2FA codes are text messaged or called into a phone number, the authentication application is not the destination endpoint of 2FA authentication information. However, use of an authentication device can be used during initial enrollment and optionally in periodically updating device profile information. To facilitate collection of a device profile, an application (either native or web based) can be invoked specifically for the enrollment process. In one variation, the application is invoked by a URI that is messaged to the phone number. The URI when activated directs a user to the authentication application or to a site to install the authentication application.

In addition to associating the application instance with an account, a device profile is additionally obtained and associated with the account. This association is preferably stored in a network accessible device authentication system that is part of a remote cloud system. The pairing of the device profile and the account functions to provide an additional authentication factor of the user device. The device profile can serve as a digital fingerprint or signature of the characteristics of the device. As mentioned above, a single application instance can be used for multiple accounts. If a device profile is already created for the application instance or stored in a device authentication service, then Block S120 may have previously been completed. The stored device profile can be used in place of collecting new device profile data in Block S120.

The reference device profile is preferably received from an authentication application. The device profile is preferably transmitted over HTTP, but the device profile can be transferred using any suitable protocol. The device profile preferably originates from an authentication application that generated the device profile. In an alternative implementation, the raw profiling data is transferred to a device authentication service, and the device authentication service processes the information into a device profile. In yet another variation, a hybrid approach includes partially forming the device profile on the authentication application and partially forming the device profile at the device authentication service. The method can additionally include creating a reference device profile S120.

Block S120, which includes creating a reference device profile functions to fingerprint the device on which the application instance is assigned. As mentioned above, the device profile can be generated fully or partially generated on the device, or the device profile can be generated fully or partially in a remote network accessible service such as the device authentication service from data collected from the device. Creating a reference device profile preferably includes generating a reference device profile S124; transmitting the reference device profile to a multi-factor authentication system S126; and at the multi-factor authentication factor system, associating the reference device profile with the first account S122. The authentication application installed in the device instance will preferably collect various data from the device as is described below. That information can be formed into some device profile data object. The device profile can be a structured/readable and/or cryptographic representation of one or more device information signals. Cryptographic representations can be a one way transformation of device information but may alternatively be some signature data signal where not just direct matches can be identified but similar device profiles can be matched. Alternatively, the raw information can be communicated to the multi-factor authentication system where it may be transformed into a final device profile format. The communication is preferably through an API of the multi-factor authentication system, but can be through any suitable communication channel.

The device profile is preferably created prior to completing enrollment. In one implementation, the device profile is generated before a user can complete the enrollment process. Alternatively, the device profile can be submitted and associated with the first application instance after accepting the application instance as an authentication mechanism. Delayed or periodic device profile creation can enable time based data to be collected and/or for the device profile information to be updated with new information. Accordingly, the device profile may be periodically or continuously updated to reflect the current state of the device profile. In one variation, conditions may be setup that restrict device instance re-enrollment based on device profile time-windows. For example, the creation of a device profile may be optional and can be created at any time. Additionally or alternatively, the use of device profile comparison may only be used for re-enrollment when the device profile has been established for some amount of time. Being established may be the time since creation or number of consistent confirmations of the device profile.

Generating a reference device profile can include collecting device information and forming a characterization of the device information. A device profile engine preferably accesses information from the device using various SDKs or interfaces of the operating system and other installed applications. The device profile is preferably substantially unique to the device and user. The device profile may not enable uniquely identifying the device but the device profile can provide a secure token, key, or signature that relates to which device is used by the user. The device profiling engine preferably collects information from the device. There are preferably multiple different profile vectors that contribute to the device profiling, wherein a profile vector is profiling component for a particular type of information. The information can relate to intrinsic properties or configurations of the device, but can additionally include information that relates to the manner of usage, settings, and preferences of a user.

In a first variation, creating a device profile can include accessing intrinsic device information and compiling the intrinsic device information into the device profile. The device profile engine can access the device operating system version, component versions, hardware properties, SIM card ID, UDID, application/advertiser ID and/or other device properties. Some of these intrinsic device properties, such as operating system version and software version values may be variable over the life of the device. Some intrinsic device properties, such as hardware versions and SIM card ID can be substantially fixed over the life of the device. The intrinsic device properties can function to enable the device profile to reflect if the physical device has changed.

In an additional or alternative variation, creating a device profile can include accessing device usage information and compiling the device usage information into the device profile, which functions to reflect the impact a user has on the state of a device. The device usage information can come from static configuration data and/or usage patterns. Users will use a device in very individualized manners. Static configuration data can include user generated or stored content or configuration. The static configuration data are static in the sense that they are preferably not substantially a function of time. Static configuration data can include media files, system settings, and other user influenced properties. Users will have different music collections, have different photo albums, have different contact lists, use different applications, and use their devices in different locations, among other forms of unique usage properties. In accessing user customization, permission can be requested from the device to access location information, contact list information, photos, videos, music, and other portions of a file system or application. A set of items, such as a music collection, provides a unique signature of who is using the device. Static configuration usage information can include cataloging a list of media in a collection. The media can be songs, playlists, movies/videos, photos, installed apps, contacts, and other collections of media. The cataloging can additionally be specialized to outside applications if access is granted. For example, the stocks added to a stock app could similarly be used. The cataloged list may be algorithmically condensed to some token, hash, or comprehensive signature. The cataloged media list can alternatively be a corpus of items. The collections can alternatively or additionally be processed to determine patterns within the collections. For example, face identification can be applied across the photos to determine a set of faces and a histogram prediction of their frequency. In another example, the music song names are processed to generate a signature reflective of the style of music the user prefers. With respect to system preferences, accessibility features, language settings, audio or display settings, communication settings (e.g., Bluetooth) setup social network identities, and other aspects may be queried through OS interfaces or other suitable mechanisms.

A variation leveraging usage pattern information can include tracking device usage over a period of time and adding a usage pattern to the device profile. The usage pattern can relate to location information, application usage, contact communication patterns, physical activity (e.g., using inertial monitoring units measure amount of exercise or physical motion of the device), or any suitable pattern. One exemplary usage pattern vector can include monitoring location periodically over the week to determine location patterns of a user to create a location vector of the device profile. Similarly, network access can be queried over time and patterns of network access (e.g., SSID information) over time can be tracked over time. The device usage information can have a high correlation to the unique manner a user uses a particular type of device. To copy device usage portions of the device profile, the usage of a user would have to be understood and simulated in another device instance. For example, with a music vector, the music collection of a user would have to be simulated. In the case of a photo collection, the photos are highly unique and would be very difficult to replicate. Thus, the device usage vectors can be used to verify identity when a physical device changes. Some user customization vectors will be preserved even if the device changes. For example, a user will update a new phone to use a backed up contact list, which can be used as a user customization vector in the device profile. Even after the physical device changes and a new instance of the authentication application are installed, a subsequent device profile can still map to the reference device profile because of the device usage vectors.

Figure 13:
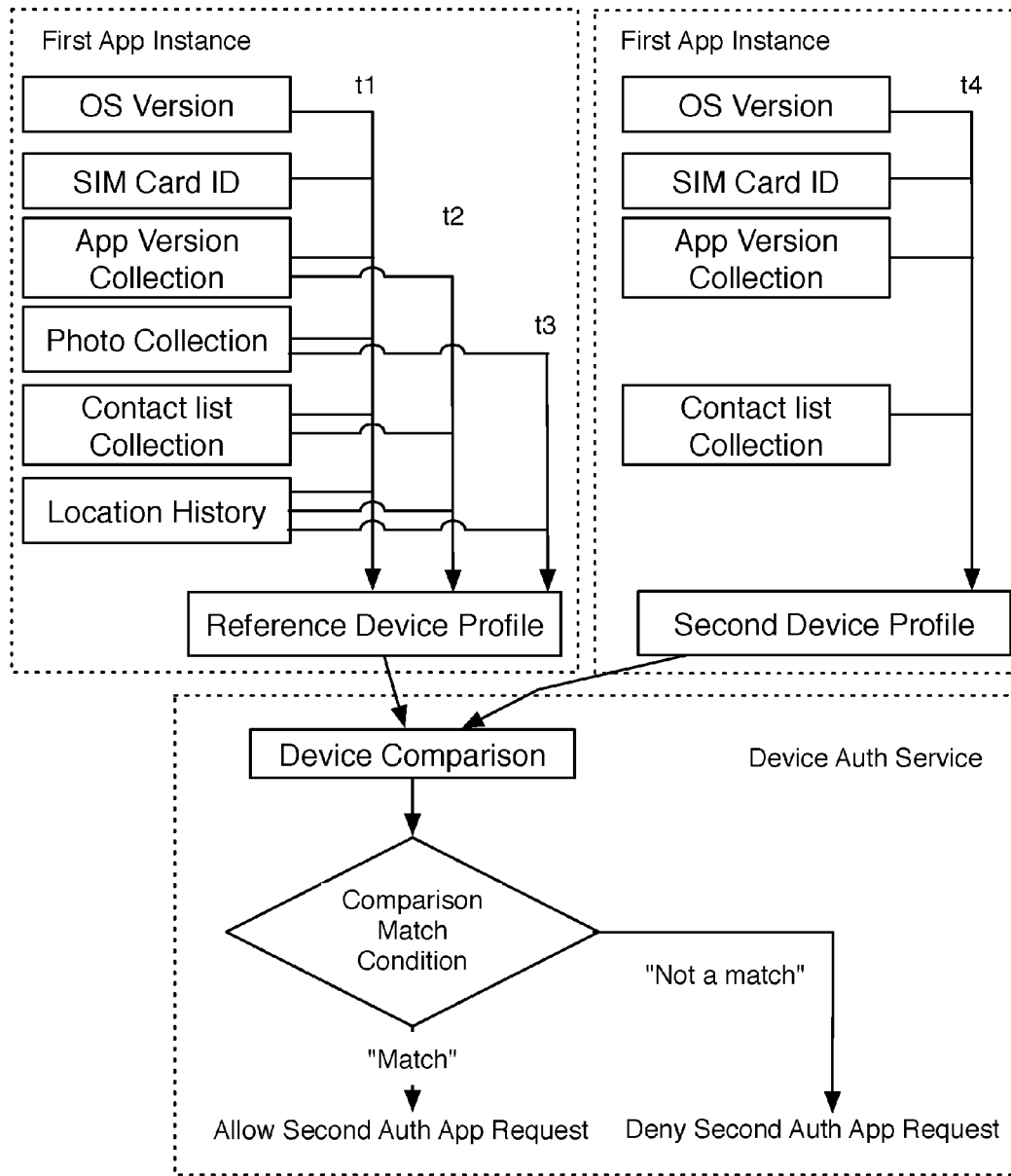
FIG. 13 is a schematic representation of an exemplary device profile comparison process.

The registered device profile may be periodically updated over time. Trends in how the registered device profile changes can additionally be used as a signal used in a reference device profile. As shown in FIG. 13, various elements of the device profile may be updated The method can additionally include periodically updating credentials of the authentication application, which functions to maintain the authentication capabilities of an application instance. As mentioned, some variations may include an authentication application that is used to manage the device-based factor of authentication for a number of different accounts. For example, a user may have 2FA configured on an authentication application for a personal email account, a work email account, and a work VPN account. Authentication credentials can be stored locally on the application. Authentication credentials for multiple accounts can be stored locally on the application and backed up on a remote device authentication service. The authentication credentials are preferably transmitted from the application to the device authentication service, and the device authentication service stores the credentials. The credentials can optionally be cryptographically encrypted by the authentication application or the device authentication service before storing the encrypted copy. An authentication application will preferably be initially set up with one or more authentication credentials. Over time these credentials may change for the one or more accounts. Additionally, the user may add or remove accounts that authenticate with the authentication application, and so authentication credentials may be added or removed.

Block S130, which includes receiving a second device profile for a second application instance, functions to have a different device profile transmitted from the authentication application. The device profile is preferably created and collected in substantially the same way as the initial reference device profile of Block S120 wherein receiving a second device profile can include generating a second device profile S134 and transmitting the second device profile to the multi-factor authentication system S136. In one variation, the second device profile can be a limited sample of a full device profile. If that portion of the device profile does not match in Block S140, additional device profile information can optionally be collected to perform a more complete device profile check before rejecting the re-enrollment request. As in the variation where the reference device profile is periodically updated, the collection of a device profile may require a significant amount of time to build up an equivalent second device profile, as such a subset of signals and sampling of data may be collected and transmitted for the second device profile.

Figure 14:
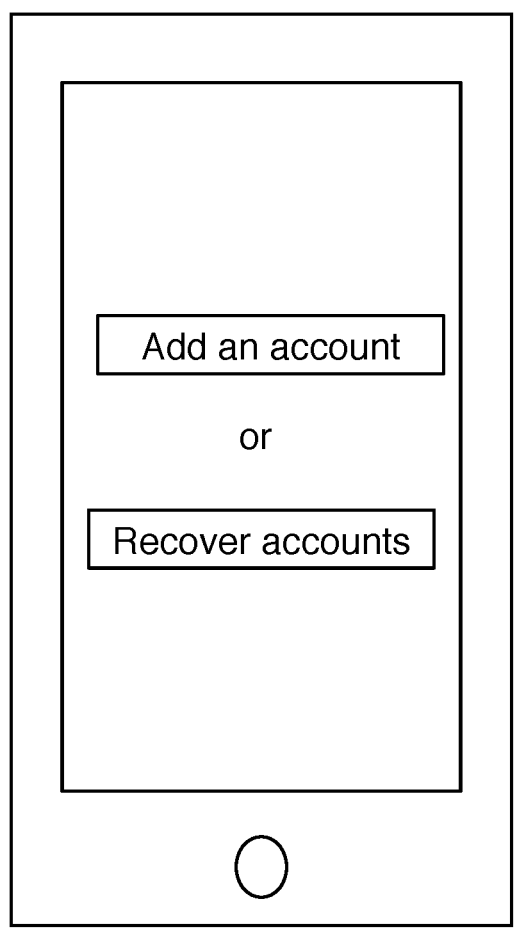
FIG. 14 is an exemplary interface screenshot of an initial re-enrollment flow.

Receiving a second device profile is preferably in response to or subsequent to initiating enrollment of a second device instance S132, wherein a different device instance wants to replace the previous device instance or to be an option in addition to the first device instance. Receiving the re-enrollment request functions to initiate a process of confirming that a device or application used as a factor of authentication can be changed. The re-enrollment request will often be received at a time removed from the initial steps of enrolling the first application instance and the reference device profile. Re-enrollment is preferably a user-initiated action within the device authentication service, and the action is often initiated when the association between an account and the corresponding authentication device has been broken. The association can be broken if the authentication application configuration data is deleted, reset or at least partially cleared; if the physical device is lost and new one is to be used; if a user wants to change devices; if the user wants to add a second device; or for any suitable reason. A new device would often require a new application instance to be installed. If a backed up application instance was installed, the authentication credentials may be backed up as well, but because of the device change, the credentials could require updating or verification before use. A second device could be added when a user desires to have two or more devices used in parallel with an authentication service wherein either of the enrolled devices can be used interchangeably to authenticate a request. The user will preferably use an account setting page to request re-enrollment of a device. For example, when logging in to a site, there may be a link for re-enrollment. In another variation, shown in FIG. 14, a user can have the option of re-enrolling presented when accessing an authentication application. The re-enrolling can be implemented as a recovery option or a syncing option. Upon user selection of this option, the authentication application proceeds to collect a second device profile and communicate with the device authentication service to determine if re-enrollment will be permitted.

The first and second device instances can be the same type of authentication application, new versions of the same type of authentication application, or different authentication applications (e.g., when changing operating systems). The first and second device instances can be on the same physical device or may be on different physical devices. The changes in the device may dynamically alter the type of device profile information collected and used. For example, if the first device is a phone with a first operating system type (e.g., iOS) and the second device is a phone with a second operating system type (e.g., Android) some of the static system configuration information such as application version numbers may not be useful, but contact lists, media collections, and location patterns may be useful.

In one variation, a reference device profile will include various signals that can be used in matching a device profile. Only a subset of the signals may be used in the second device profile. In some cases, the method can include detecting a profiling level of a request, and then selectively generating the second profile to fulfill the profiling level of the request. The profiling level can define the types and thoroughness of the various signals or data collected/used in the second profile. The profiling level may be set based on some policy on what types of device profiling requirements need to be met for certain actions. At a basic level, the second device profile from the second device instance can collect a basic set of signals which can support a change in device such as device usage vectors like media and contact lists. One exemplary heightened profiling level may be used for requests that need more assurance of a match between the device profiles. A heightened profiling level may use a profile generation time period (e.g., one day or week) where basic device profile vectors are collected and additionally environmental usage patterns are monitored and converted into usage pattern vectors. In a same-device profiling level, device related signals such as OS version, SIM card ID, and user device ID. Any suitable set of device profiling levels may be set and applied depending on policy.

Alternatively, Block S130 is performed in response to or subsequent to receiving an authentication request of a device S134, which functions to use a device profile comparison as an additional factor of authentication. The alternative embodiment employing Block S134 preferably involves the authentication device automatically collecting a device profile during the authentication process. The device profile comparison can supplement the authentication criteria for normal logins and/or be used in special login requests such as for actions with higher security or privacy restrictions. The device profile comparison can additionally be upon an error or event triggers a flag, such as multiple login attempts, suspicious login patterns, or other events that would prompt the increase in security.

Block S140, which includes comparing the first device profile and the second device profile, functions to evaluate the correspondence to a stored reference device profile. A score can be calculated reflecting the similarity of the two device profiles, alternatively a match percentage, a match probability/histogram, a set of results for different vectors of the device profile, and/or any suitable signal of device similarity can be generated. Depending on the device profile vector, the comparison can occur in different manners. In a first option, a device profile vector can be compared with an exact or fuzzy match of a single value. Operating system version, component versions, hardware properties, SIM card ID, UDID, application/advertiser ID, and other device properties can be directly compared between the first device profile and the second device profile. As described above, the comparison can factor in a state-machine of device information, which can define the allowed transition or changes in device profile information. For example, application version numbers may be expected to increase or stay the same. This direct comparison can provide base information about changes in the device. For example, if the SIM card ID changed, the phone number may have changed, but the device could be the same. If the device operating system changed, the device may have been updated. If hardware components change, such as the screen resolution changes, then the device has changed.

In a second option, a device profile vector can be compared through pattern matching. Pattern matching does not rely on exact matches between the vectors but can report the probability that the two device profile vectors correspond to the same user/device. Pattern matching is preferably used for device usage vectors such as a music collection vector, a photo collection vector, an application collection vector, and the like. For example, when comparing music collection vectors, some percentage of songs will likely be shared across the two profiles, some songs may not be included in the first device profile, and some songs may not be included in the second device profile. The pattern matching in this example, can base the probability of matching on the songs shared in common and the similarity of the genres of new music in the second device profile. Other pattern techniques can be used such as facial recognition in photo collections, weighting shared items by their popularity, and other suitable approaches. Items that are unlikely but shared in common can be weighted higher when calculating the score.

In one variation, the device profile may include a history component and thus there may be a waiting period before the second device profile can be evaluated. For example, if location patterns are one such device profile vector, the second device profile may need to collect location information over a certain time period (e.g., over one day, week, or month). The amount of history information may be proportional to the amount of other device profile information that matches. If the contact information of the two device profiles have a 95% match and the current location information corresponds to the historical location patterns, then the device profiles can be determined to match. However, if the contact information of the second device profile is empty or only has a 25% match, comparing the two device profiles can include greater weighting of the historical location information. Other device profile parameters that can include a historical pattern aspect may be browsing patterns, application usage patterns, communication patterns, and other parameters with a time based dimension.

The various device profile vectors or components may be individually compared, and different criteria may exist for each comparison. Additionally, the results of one device profile vector comparison can alter the criteria of another. In one variation, if an intrinsic device vector of the two device profiles is compared and the results indicate that the physical device has changed, the criteria of the device usage vectors can be made stricter or be given increased weighting.

In response to comparing the first and second device profile, the method can perform several optional actions. In a preferred embodiment, the method is used in re-establishing the relationship between an account and a second form of authentication (e.g., the user device or an authentication application instance), in which case the method can include assigning the second application instance if the first and second device profiles satisfy a matching criteria S150. In an alternative embodiment, the method is used in confirming multi-factor authentication of an account supplementing the multi-factor authentication process, in which case the method can include verifying multi-factor authentication of a user if the first and second device profiles satisfy a matching criteria S160. If the second device profile does not satisfy a comparison condition, then the interaction with the second device instance is preferably canceled, stopped, flagged for additional confirmation, or responded to in a suitable manner. If the second device profile doesn't match the device profile on record, that may signal that someone is attempting to maliciously change an enrolled device, impersonate the enrolled device, or perform other illicit behavior.

The method preferably acts on the comparison by completing a request of the second application instance according to results of comparing the second device profile and the first device profile, which functions to selectively act on a request based on success or failure of the device profile comparison. Preferably, completing a request includes assigning the second device instance S150. The method may additionally or alternatively include verifying multi-factor authentication of a user S160. The request may be an enrollment request. The request may alternatively be an authentication request.

Block S150, which includes assigning the second device instance, functions to update an account to associate with the application instance. Assigning a new application instance can include completing the enrollment of the second device instance enrollment according to a result of the comparison of the second device profile and the reference device profile S152. Completing enrollment can include updating database records of an account within the device authentication service. Additionally, assigning a new application instance can include transferring stored credentials of the account to the application instance. In this way re-enrolling can re-establish all accounts managed by the device authentication service. In an alternative variation, a new set of credentials is created for the second device instance. The new set of credentials preferably adds a second optional set of authentication credentials for registered accounts (i.e., for a set of the services used with an authentication application). The new credentials may alternatively replace the existing credentials stored in the device authentication system, which invalidates use of the first device instance. In both variations, a new application instance can restore the 2FA credentials for the personal email account, the work email account, and the work VPN account through a single re-enrollment request. The second application instance is often a new instance of the authentication application. As mentioned, this can result from a change of a physical device and/or new installation of the authentication application. In a first variation, assigning the second application instance includes reassigning the association of an account with the first application instance to the second application instance. The prior association between the account and the first authentication application instance in the account record is removed and replaced with an association between the account and the second authentication application instance. In subsequent authentication attempts, the second authentication application will be used instead of the original second authentication application. The second authentication application is preferably the same application. A new instance can include the same application installed on a new device, an updated version of the application, an application with all or a portion of the credential data missing. The second authentication application can alternatively be a completely different application. For example, a user may want to transfer the 2FA capabilities for an email account previously handled in a general purpose 2FA application to an email account specific application. In a second variation, an association to the second application instance is added in addition to the existing one with the first authentication application instance. This variation enables two active application instances to be used to complete two factor authentication. A benefit of S150 is that it can automate the process of an administrator confirming the change of an authentication device. The method can additionally include transmitting an alert or requesting confirmation of an administrator.

Block S160, which can include verifying multi-factor authentication of a user, functions to use the device profile as criteria used in verifying an authentication request. The device profile form of authentication will preferably be used as a third form of authentication. Block S160 may be used in addition to S150 or in place of S150. For example, a user will provide a username and password to website; that website will invoke the 2FA service to push an authentication notification to the authentication application of the corresponding account; the user will respond through the authentication application on their phone to confirm the login request; transparently, a device profile is generated and sent along with the user confirmation; and the 2FA service uses the user confirmation and the device profile match to confirm or deny the authentication request on the website. In another variation, the device profile can be used as a second factor of authentication. The device profile can be sent as a signature with a normal login request made on the device itself. In one example where a social networking application is the authentication application, the user supplies a username and password; the application sends the login credentials along with a generated device profile; the social networking server verifies the user credentials and confirms that the device profiles match before allowing login. The device profile approach to authentication may be used in response to heightened permission requirements or a raised security flag. If a user makes several consecutive failed login attempts, the device profile can be used to authenticate eventually-successful credentials or to allow/block further login attempts. Similarly, the device profile authentication approach can be used for actions that require increased security. For example, changing a password of an account could require device profile verification.

The system and method may additionally collect any additional authentication information to further add factors of authentication. For example a PIN provided by an end user may be used in conjunction with the system to improve security. The PIN and the device profile may need to be verified to complete credential restore or authentication.

If a second device instance is successfully enrolled or authenticated, the second device profile may set as a new reference device profile for subsequent enrollment or authentication requests. Similarly, the second device profile may be incorporated into the reference device profile as an update to the reference device profile.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the authentication application and the device authentication service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
receiving a first digital fingerprint and associating the first digital fingerprint with a first application instance, operable on a first electronic device, the first application instance assigned as an authentication factor of a first account, wherein the first digital fingerprint is indicative of characteristics of the first electronic device;
receiving a request from a second application instance, the second application instance operable on a second electronic device; wherein receiving the request comprises receiving a second digital fingerprint associated with the second application instance; wherein the second digital fingerprint is indicative of characteristics of the second electronic device; wherein the request is associated with the first account;
generating a comparison of the first digital fingerprint and the second digital fingerprint; wherein generating the comparison comprises evaluating a match between the first digital fingerprint and the second digital fingerprint; and
processing the request according to the comparison of the first digital fingerprint and the second digital fingerprint.

2. The method of claim 1,
wherein evaluating the match results in the match failing to satisfy a match threshold;
wherein processing the request further comprises:
collecting supplemental digital fingerprint information indicative of supplemental characteristics of the second electronic device, the supplemental characteristics distinct from and in addition to the characteristics of the second electronic device;
updating the second digital fingerprint with the supplemental digital fingerprint information, thereby generating an updated second digital fingerprint;
generating a comparison of the updated second digital fingerprint and the first digital fingerprint; and
further processing the request according to the comparison of the updated second digital fingerprint and the first digital fingerprint.

3. The method of claim 2, further comprising:
receiving additional digital fingerprint information indicative of the characteristics of the first electronic device;
detecting that the additional digital fingerprint information is more up-to-date than at least a subset of information contained within the first digital fingerprint; and
in response to detecting that the additional digital fingerprint information is more up-to-date than at least the subset of information contained within the first digital fingerprint, updating the first digital fingerprint with the additional digital fingerprint information;
wherein generating the comparison of the updated second digital fingerprint and the first digital fingerprint comprises generating a comparison of the updated second digital fingerprint and the additional digital fingerprint information.

4. The method of claim 1, further comprising:
receiving additional digital fingerprint information indicative of the characteristics of the first electronic device;
detecting that the additional digital fingerprint information is more up-to-date than at least a subset of information contained within the first digital fingerprint; and
in response to detecting that the additional digital fingerprint information is more up-to-date than at least the subset of information contained within the first digital fingerprint, updating the first digital fingerprint with the additional digital fingerprint information;
wherein generating the comparison of the first digital fingerprint and the second digital fingerprint comprises generating a comparison of the second digital fingerprint and the additional digital fingerprint information.

5. The method of claim 1, further comprising:
collecting second electronic device information at the second application instance, the collecting comprising:
generating a comparison of a first operating system type of the first electronic device and a second operating system type of the second operating system type,
determining one or more types of device profile information to be collected based on the comparison of the first operating system type and the second operating system type; and
collecting the second electronic device information according to the determined types of device profile information; and
generating, at the second application instance, the second digital fingerprint from the second electronic device information.

6. The method of claim 5, wherein determining the one or more types of device profile information to be collected comprises determining that the one or more types of device profile information include application version numbers in response to the comparison of the first and second operating system types indicating identical operating system types.

7. The method of claim 5, wherein the first and the second digital fingerprints each comprise intrinsic device information and device usage information, and wherein generating the comparison of the first digital fingerprint and the second digital fingerprint comprises:
assigning a greater weight to the device usage information if the comparison of the first and the second operating system types indicates distinct operating systems, wherein evaluating the match comprises evaluating the match based on the greater weight.

8. The method of claim 1, further comprising:
assigning the first application instance as an authentication factor of a second account;
receiving a second account request from the second application instance; wherein receiving the second account request comprises receiving a third digital fingerprint of the second application instance;
generating a comparison of the third digital fingerprint and the first digital fingerprint; and
processing the second account request according to the comparison of the third digital fingerprint and the first digital fingerprint.

9. The method of claim 1, further comprising:
receiving a digital fingerprint match policy, the policy specified by an administrator of a service provider, wherein the first account is an account of the service provider,
wherein evaluating the match between the first digital fingerprint and the second digital fingerprint comprises evaluating the match according to the digital fingerprint match policy.

10. The method of claim 1, wherein the request is a request to authenticate a user of the first account.

11. The method of 10, further comprising classifying the first account as a flagged first account requiring increased security, wherein receiving the request and receiving the second digital fingerprint are in response to a login attempt to the flagged first account.

12. The method of claim 10, wherein receiving the request and receiving the second digital fingerprint are in response to a failed login attempt to the first account.

13. The method of claim 1, wherein the request is an authentication request, the method further comprising:
receiving a user-submitted username and password for the first account; and
comparing the user-submitted username and password to a stored username and password associated with the first account;
wherein receiving the second digital fingerprint comprises receiving the second digital fingerprint in response to successfully comparing the user-submitted username and password and the stored username and password;
wherein the comparison of the first and the second digital fingerprints is independent of and in addition to comparison of the user-submitted username and password and the stored username and password.

14. The method of claim 13, wherein evaluating the match results in the match failing to satisfy a match threshold, and wherein processing the request comprises performing additional authentication steps in addition to both of comparing the first and the second digital fingerprints and comparing the user-submitted username and password and the stored username and password.

15. The method of claim 1, wherein evaluating the match between the first and the second digital fingerprints comprises calculating a probability of a digital fingerprint match, and wherein the match is a successful digital fingerprint match upon the probability exceeding a match threshold.

16. The method of claim 15, further comprising:
receiving a digital fingerprint match policy from an administrator of a service provider, wherein the digital fingerprint match policy specifies a preferred match threshold, and wherein the first account is an account of the service provider; and
updating the match threshold to the preferred match threshold.

17. The method of claim 1, further comprising: establishing, at the first application instance, a first set of authentication credentials for a set of accounts; wherein the request from the second application instance is to enroll the second application instance as an authentication application of the first account; and wherein processing the request comprises establishing a second set of authentication credentials for the set of accounts on the second application instance in response to a successful digital fingerprint match.

18. The method of claim 17, wherein the first electronic device is distinct from the second electronic device.

19. The method of claim 1, wherein the request from the second application instance is a request to verify multi-factor authentication of the first account; and wherein processing the request of the second application instance verifying multi-factor authentication of a user associated with the first account in response to a successful digital fingerprint match.

20. The method of claim 19, wherein the first application instance is the second application instance.

21. The method of claim 1, further comprising:
accessing intrinsic device information of the first electronic device; and
compiling the intrinsic device information into the first digital fingerprint; wherein intrinsic device information comprises one of an international mobile subscriber identity (IMSI) and an international mobile station equipment identity (IMEI); wherein comparison of the second digital fingerprint to the first digital fingerprint is dependent on the intrinsic device information.

22. The method of claim 1, further comprising:
accessing device usage information of the first electronic device; and
compiling the device usage information into the first digital fingerprint, wherein the comparison of the second digital fingerprint to the first digital fingerprint is dependent on the device usage information.

23. The method of claim 22, wherein accessing the device usage information comprises accessing usage configuration data.

24. The method of claim 23, wherein accessing the usage configuration data comprises retrieving a set of stored media files.

25. The method of claim 22, wherein accessing the device usage information comprises tracking device usage over time.

26. The method of claim 25, wherein the tracking device usage comprises tracking location, application usage, and communication patterns.

27. The method of claim 22, further comprising:
accessing intrinsic device information of the first electronic device; and
compiling the intrinsic device information into the first digital fingerprint; wherein comparison of the second digital fingerprint to the first digital fingerprint is further dependent on the intrinsic device information.

28. A method comprising:
receiving a first digital fingerprint comprising a first set of digital fingerprint vectors;
associating the first digital fingerprint with a first application instance, operable on a first electronic device, the first application instance assigned as an authentication factor of a first account;
receiving a request from a second application instance, the second application instance operable on a second electronic device; wherein receiving the request comprises receiving a second digital fingerprint associated with the second application instance; wherein the request is associated with the first account;
generating a comparison of the first digital fingerprint and the second digital fingerprint; wherein generating the comparison comprises evaluating a match between the first set of digital fingerprint vectors and the second set of digital fingerprint vectors; and
processing the request according to the comparison of the first digital fingerprint and the second digital fingerprint.

29. The method of claim 28, wherein each of the first set of digital fingerprint vectors is of a user customization vector type, a device usage vector type, or an intrinsic device vector type, and wherein each of the second set of digital fingerprint vectors is of the user customization vector type, a device usage vector type, or the intrinsic device vector type.

30. The method of claim 29, wherein evaluating the match between the first and the second sets of digital fingerprint vectors comprises: assigning weights for each vector of the first and the second set of digital fingerprint vectors based on whether the vector is of the user customization vector type, the device usage vector type, or the intrinsic device vector type, wherein the match is based on the weights, and wherein processing the request comprises processing the request according to the match.

31. The method of claim 30, further comprising:
generating a comparison of a first device type of the first electronic device and a second device type of the second electronic device;
wherein assigning weights comprises assigning an increased weight for the device usage vector type if the comparison of the first and the second device types indicates distinct device types;
wherein the match is based on the increased weight.

32. The method of claim 29, wherein the device usage vector type comprises a location characteristic based on monitoring location of an electronic device over time.

33. The method of claim 29, wherein the user customization vector type comprises a contact list characteristic of an electronic device.

34. The method of claim 29, wherein the intrinsic device vector comprises operating system type and operating system version.

35. The method of claim 28, wherein the second set of digital fingerprint vectors includes fewer digital fingerprint vectors than the first set of digital fingerprint vectors, and wherein comparing the second set of digital fingerprint vectors to the first set of digital fingerprint vectors comprises comparing the second set of digital fingerprint vectors to a subset of the first set of digital fingerprint vectors.

36. The method of claim 28, wherein evaluating a match between the first and the second sets of digital fingerprint vectors comprises evaluating the match through pattern matching, wherein the pattern matching does not rely on exact matches between digital fingerprint vectors.

37. The method of claim 36, wherein evaluating the match through pattern matching comprises calculating a probability of a digital fingerprint match, and wherein the match is a successful digital fingerprint match upon the probability exceeding a digital fingerprint match threshold.

* * * * *